United States Patent
Sakaguchi et al.

[11] Patent Number: 5,267,158
[45] Date of Patent: Nov. 30, 1993

[54] LOCK-UP CLUTCH FUZZY LOGIC CONTROL SYSTEM OF VEHICLE AUTOMATIC TRANSMISSION

[75] Inventors: Shinichi Sakaguchi; Ichiro Sakai, both of Saitama, Japan

[73] Assignee: Honda Giken Kogyo Kabushiki Kaisha, Tokyo, Japan

[21] Appl. No.: 940,487

[22] Filed: Sep. 4, 1992

[30] Foreign Application Priority Data

Sep. 14, 1991 [JP] Japan .................. 3-263012

[51] Int. Cl.⁵ .................. B60K 41/22; B60K 41/04
[52] U.S. Cl. .................. 364/424.1; 364/424.01; 74/866
[58] Field of Search .................. 364/424, 424.1; 74/866

[56] References Cited

U.S. PATENT DOCUMENTS

| | | | |
|---|---|---|---|
| 4,261,229 | 4/1981 | Mizuno et al. | 74/866 |
| 4,957,194 | 9/1990 | Sawa et al. | 192/.096 |
| 5,019,979 | 5/1991 | Takahashi | 364/424.1 |
| 5,036,730 | 4/1991 | Sakai et al. | 364/424.1 |
| 5,079,704 | 1/1992 | Sakai et al. | 364/424 |
| 5,095,435 | 3/1992 | Tokoro et al. | 364/424.1 |
| 5,115,395 | 5/1992 | Petzold | 74/866 |
| 5,121,820 | 1/1992 | Brown et al. | 364/424.1 |
| 5,123,302 | 1/1992 | Brown et al. | 364/424.1 |
| 5,124,916 | 1/1992 | Tokoro et al. | 364/424.1 |
| 5,148,721 | 9/1992 | Anan et al. | 74/866 |

FOREIGN PATENT DOCUMENTS

| | | |
|---|---|---|
| 0126201 | 11/1984 | European Pat. Off. |
| 0410223 | 1/1991 | European Pat. Off. |
| 2-212668 | 8/1990 | Japan |
| 3-103665 | 4/1991 | Japan |
| 3-125062 | 5/1991 | Japan |
| 4-000060 | 1/1992 | Japan |

*Primary Examiner*—Thomas G. Black
*Assistant Examiner*—Tan Q. Nguyen
*Attorney, Agent, or Firm*—Lyon & Lyon

[57] ABSTRACT

A system for controlling a lock-up clutch of a torque converter in which a target speed ratio of the torque converter of an automatic transmission of a vehicle which mechanically couples a pump impeller connected to an engine output shaft with a turbine runner connected to a transmission input shaft, is determined by carrying out a fuzzy reasoning based on fuzzy production rules using a degree of throttle opening, a grade resistance and a current speed ratio as parameters. Then a second fuzzy reasoning is carried out based on second fuzzy production rules using a deviation between the target speed ratio and the current speed ratio and the change of the deviation as parameters to determine a control value such that the lock-up clutch is controlled between a position at which the clutch is fully engaged and a position at which the clutch is fully not engaged including an intermediate position at which the clutch is partially engaged. With this system, the lock-up control can cope with various vehicle operating conditions so that the vehicle drivability and fuel consumption is improved while suppressing engine noise. This system further enables control that is better matched to the intention, decision-making, and feelings of a human driver.

16 Claims, 26 Drawing Sheets

FIG. 6

| Rule number | Rule type | Subject | Antecedent | Conclusion | Rule meaning |
|---|---|---|---|---|---|
| 1 | Basic rule | Ordinary driving | (θ_TH, 0 to WOT) | (Δe, -1.0 to 1.0) | If throttle opening is large and speed ratio is large, then make speed ratio small. |
| 2 | " | " | (θ_TH, 0 to WOT) | (Δe, -1.0 to 1.0) | If throttle opening is small and speed ratio is small, then make speed ratio large. |
| 3 | " | " | (N_T, 0 600 6000 8000) | (Δe, -1.0 to 1.0) | If turbine speed is high, then make speed ratio large. |
| 4 | " | " | (N_T, 0 600 6000 8000) | (Δe, -1.0 to 1.0) | If turbine speed is low, then make speed ratio small. |

FIG. 7

| Rule number | Rule type | Subject | Antecedent | Conclusion | Rule meaning |
|---|---|---|---|---|---|
| 5 | Extra rule | Hill-climbing | (graph: 1.0 vs grade resistance 0, 50, 150) | (triangle graph, 0 to 1.0 on $\Delta e$) | If throttle opening is large during hill-climbing, then make speed ratio small. |
| 6 | " | Deceleration | (graph: 1.0 vs $\theta_{TH}$, 0 to WOT; and vs $e$, 0 to 1.0, 1.2) | (triangle graph, -1.0 to 0 on $\Delta e$) | If accelerator is released and speed ratio is very large, then make speed ratio small. |
| 7 | " | High ATF temp. | (graph: 1.0 vs ATF temp.(°C) 0, 100, 140, 200) | (triangle graph, 0 to 1.0 on $\Delta e$) | If ATF temperature is high, then make speed ratio large. |
| 8 | " | Low ATF temp. | (graph: 1.0 vs ATF temp.(°C) 0, 20, 60) | (triangle graph, -1.0 to 0 on $\Delta e$) | If ATF temperature is low, then make speed ratio small. |

FIG.8

| Rule number | Rule type | Subject | Antecedent | Conclusion | Rule meaning |
|---|---|---|---|---|---|
| 9 | Meta-rule | Rapid braking | Tire speed (rpm), 1.0 at 0–200 | LOCK-UP OFF (e=0) | If tire speed is very low, then release lock-up. |
| 10 | " | " | Tire speed change (rps), 1.0 at −400–0 | LOCK-UP OFF (e=0) | If tire speed change is very large in the negative direction, then release lock-up. |

FIG. 9

| Rule number | Rule type | Subject | Antecedent | Conclusion | Rule meaning |
|---|---|---|---|---|---|
| 11 | Basic rule | Ordinary driving | E: 0 to 0.3 (1.0); ΔE: -0.05 to 0 (1.0) | ΔDUTY(%): 1.0 at -100 to 0 | If E is large in the positive direction and ΔE is large in the positive direction, then make operation amount large in the negative direction. |
| 12 | " | " | E: 0 to 0.3 (1.0); ΔE: 0 to 0.05 (1.0) | HOLD (ΔDUTY(%) = 0%) | If E is large in the positive direction and ΔE is large in the negative direction, then hold current operation amount. |
| 13 | " | " | E: -0.3 to 0 (1.0); ΔE: -0.05 to 0 (1.0) | HOLD (ΔDUTY(%) = 0%) | If E is large in the negative direction and ΔE is large in the positive direction, then hold current operation amount. |
| 14 | " | " | E: -0.3 to 0 (1.0); ΔE: 0 to 0.05 (1.0) | ΔDUTY(%): 1.0 at 0 to 100 | If E is large in the negative direction and ΔE is large in the negative direction, then make operation amount large in the negative direction. |

FIG.10

| Rule number | Rule type | Subject | Antecedent | Conclusion | Rule meaning |
|---|---|---|---|---|---|
| 15 | Extra rule | Ordinary driving | E (−0.05 to 0.05), $\Delta^2 E$ (−0.01 to 0.01) | HOLD ($\Delta$DUTY(%) = 0%) | If E is near zero and $\Delta^2 E$ is near zero, then hold current operation amount. |
| 16 | 〃 | 〃 | E (0.2 to 0.5) | $\Delta$DUTY(%) (−100 to −70) | If E is largest in the positive direction, then make operation amount largest in the negative direction. |
| 17 | 〃 | 〃 | E (−0.5 to −0.2) | $\Delta$DUTY(%) (70 to 100) | If E is largest in the negative direction, then make operation amount largest in the positive direction. |
| 18 | 〃 | Low ATF temp. | ATF tem. (°C) (20 to 60), E | $\Delta$DUTY(%) (−100 to −70) | If ATF temperature is low and E is large in the positive direction, then make operation amount largest in the negative direction. |

FIG. 11

| Rule number | Rule type | Subject | Antecedent | Conclusion | Rule meaning |
|---|---|---|---|---|---|
| 19 | Extra rule | Low ATF temp. | (graphs: ATF temp. (°C) 20–60; E −1.0 to 0) | ΔDUTY (%) 0–70–100 | If ATF temperature is low and E is large in the negative direction, then make operation amount largest in the positive direction. |

FIG. 16

| Parameters | Parameter number | Function number | | Membership value |
|---|---|---|---|---|
| Throttle opening $\theta_{TH}$ | 1 | 0.3 ⟋ | 1 | 0.3 |
| | | 0.7 ◣ | 2 | 0.7 |
| | | 0 ◺ | 3 | 0 |
| | | ⌐ | 4 | |
| | | ⌐ | 5 | |
| | | ⌐ | 6 | |
| Speed ratio e | 2 | 0.8 ⟋ | 7 | 0.8 |
| | | 0.2 ◣ | 8 | 0.2 |
| | | ⋮ | ⋮ | |
| | ⋮ | ⋮ | ⋮ | |
| | 19 | | 76 | |

Weighted mean $$= \frac{0.3 \times (-\frac{1}{3}) + 0.2 \times (\frac{1}{3})}{0.3 + 0.2}$$

$$\fallingdotseq -0.067$$

LOCK-UP CLUTCH FUZZY LOGIC CONTROL SYSTEM OF VEHICLE AUTOMATIC TRANSMISSION

BACKGROUND OF THE INVENTION

1. Field of the Invention

This invention relates to an improved system for controlling the lock-up clutch of torque converter of a vehicle automatic transmission system.

2. Description of the Prior Art

In conventional control of the lock-up clutch of an automatic transmission used in a vehicle, the engagement range of the lock-up clutch is determined by retrieval from a two-dimensional shift diagram stored in a microcomputer memory as a map, hereinafter referred to as "shift diagram map", using the vehicle speed and the throttle opening as parameters. However, it is not possible to determine the motive force (reserve engine power) of the vehicle solely from these two parameters, as is obvious from the fact that a throttle opening and vehicle speed appropriate for level-road driving will not provide adequate motive force during hill-climbing. On the other hand, from the points of fuel economy, noise suppression and the like it is necessary to expand the engagement range of the lock-up clutch so as to reduce torque converter slip and thus increase the power transmission efficiency and reduce the engine speed. It is extremely difficult to overcome both problems with control based on the conventional shift diagram map. If, for example, the engagement range is expanded for optimum performance during level-road driving, the drivability will be markedly degraded by insufficient motive force during hill-climbing. However, if an attempt is made to secure good drivability over a wide range of driving conditions including hill-climbing, the engagement range of the lock-up clutch will become so narrow as to impair its effectiveness during high-speed driving and deceleration.

Moreover, when the accelerator pedal of a vehicle equipped with an automatic transmission controlled in the conventional manner using the shift diagram map is frequently depressed and released, as happens during driving in a mountainous area or as the driver may do at his or her own volition, the lock-up clutch frequently engages and disengages, with the result that clutch wear increases and the fuel economy is degraded rather than enhanced. Briefly stated, what this means is that the prior art map-based lock-up clutch control is incapable of responding to the intentions and expectations of the driver, who tends to use his or her impressions of the operations of an expert driver driving a vehicle with a manual transmission as a standard for evaluating the control. Thus for providing control more closely matched to the intentions, judgments and feelings of the driver, Japanese Laid-open Patent Publication No. 3(1991)-103665 proposes a control system in which the road grade is determined from the vehicle speed and the engine output, and fuzzy reasoning is conducted on the basis of engine and driving parameters including road grade for controlling engagement/disengagement of the lock-up clutch.

However, since this prior art control system only provides ON/OFF control between the engaged and disengaged states of the lock-up clutch in the third and fourth gears of the D range and does not provide control for semi-engaged clutch states, it does not take full advantage of the capability of the lock-up clutch to improve torque converter transmission efficiency while simultaneously using clutch semi-engagement to suppress the engine vibration that tends to become a problem during low speed driving.

In addition, there are two types of fuzzy reasoning, that using fuzzy relationships and that using fuzzy production rules, and this prior art system controls clutch engagement/disengagement by fuzzy reasoning using fuzzy relationships. Specifically, there are established rules whose antecedents specify the conditions to be met for engagement/disengagement of the lock-up clutch, the degree of satisfaction of each control rule is determined and compared with that of the other rules, and the consequent of the rule whose antecedent has the greatest degree of satisfaction is selected for implementation. Reasoning by fuzzy relationships deals with a model expressed as complex relationships involving various fuzzy relationships connected in series and parallel. This form of reasoning is suitable for troubleshooting or diagnosis and other types of backward reasoning but is not appropriate for forward reasoning which, as in the case of decisions regarding lock-up, requires control values to be determined through the analysis of current phenomena. In contrast, fuzzy reasoning by rules uses a model expressed on the control side in terms of "If . . . , then . . . ," permit human behavior patterns to be easily expressed and the creation of a knowledge base to be facilitated. As this mode of reasoning also makes it possible to formulate rules in the manner of a dialogue, it enables the control know-how acquired through the experience of an expert driver to be incorporated with increased accuracy so that control and response matched to human feelings can be more readily realized Moreover, modifications in the control rules are easy to implement.

The aforesaid prior art control determines the road grade through calculations without using a sensor. While this has the advantage of reducing the cost of the sensor system, it is disadvantageous in that the calculated value is only an estimate and is not necessarily adequate as regards reliability.

SUMMARY OF THE INVENTION

An object of the invention is, therefore, to provide a system for controlling the lock-up clutch of a vehicle automatic transmission which overcomes the aforesaid shortcomings of the prior art and specifically to provide such a system which, by continuously controlling all states of the lock-up clutch between engagement and disengagement, including semi-engaged states, and by taking full advantage of the unique capabilities of the lock-up clutch through the use of control values obtained by fuzzy reasoning based on fuzzy production rules, enables control that is better matched to the intention, decision-making, and feelings of a human driver.

Another object of the invention is to provide a system for controlling the lock-up clutch of an automatic transmission which, like the prior art system, determines the driving resistance by processing operations without using a sensor but which ascertains the value thereof with markedly higher accuracy.

For realizing these objects, the present invention provides a system for controlling a lock-up clutch of a torque converter of an automatic transmission of a vehicle which mechanically couples a pump impeller connected to an engine output shaft with a turbine runner connected to a transmission input shaft, comprising first means for determining parameters indicative of operating conditions of the vehicle at least including an engine load, a driving resistance and a speed ratio of the torque converter, second means for carrying out a fuzzy reasoning to determine a target speed ratio based on fuzzy production rules each having an antecedent made up of a membership function defined with respect to at least one of the parameters and a consequent made up of a membership function defined with respect to the target speed ratio and third means for determining a control value of an actuator in response to the determined target value between the states in which the clutch is fully locked up and the clutch is fully not locked up including the state in which the clutch is partially locked up.

BRIEF DESCRIPTION OF THE DRAWINGS

These and other objects and advantages of the invention will be more apparent from the following description and drawings, in which:

FIG. 6 is a chart showing fuzzy production rules used in a first fuzzy reasoning referred to in FIG. 4 flow chart to determine a target speed ratio;

FIG. 7 is a chart showing similar rules used in the first fuzzy reasoning;

FIG. 8 is a chart still showing similar rules used in the first fuzzy reasoning;

FIG. 9 is a chart showing fuzzy production rules used in a second fuzzy reasoning referred to in FIG. 4 flow chart to determine a target duty ratio;

FIG. 10 is a chart showing similar rules used in the second fuzzy reasoning;

FIG. 11 is a chart still showing similar rule used in the second fuzzy reasoning;

FIG. 16 is a chart explaining parameter numbers and function numbers referred to in FIG. 4 flow chart;

DETAILED DESCRIPTION OF THE PREFERRED EMBODIMENT

Embodiments of the invention will now be explained with reference to the attached drawings.

Figure 1:
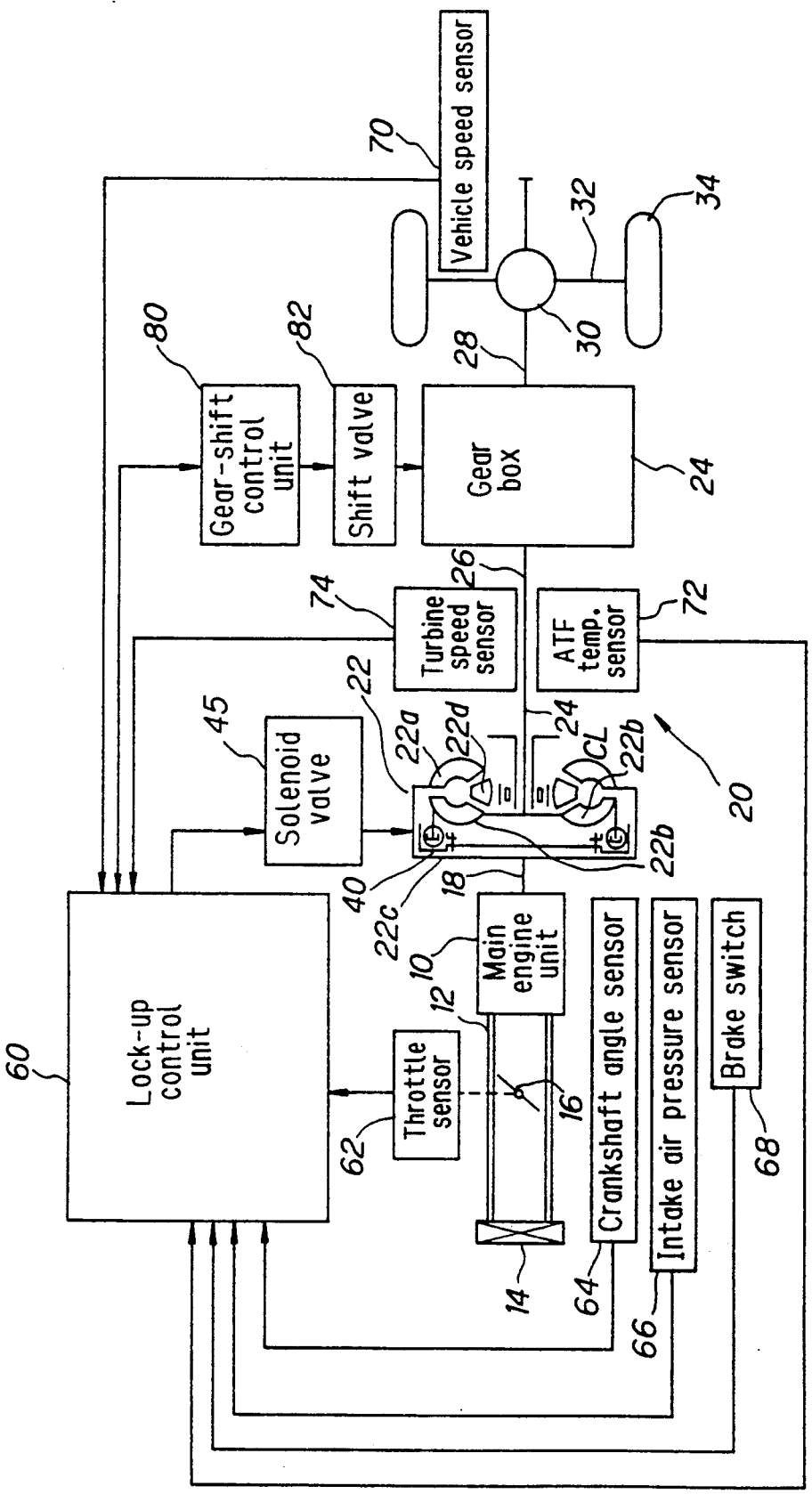
FIG. 1 is a schematic diagram showing the overall arrangement of a lock-up clutch control system of a vehicle automatic transmission.

FIG. 1 is a schematic diagram showing the overall arrangement of the system for controlling the lock-up clutch of a vehicle automatic transmission according to the present invention, in which the reference numeral 10 denotes the main unit of an internal combustion engine. The main engine unit 10 is connected with an air intake passage 12 having an air cleaner 14 attached to its far end. The flow rate of intake air supplied to the main engine unit 10 via the air cleaner 14 and the air intake passage 12 is controlled by a throttle valve 16 linked with and operated by means of an accelerator pedal (not shown) located on the vehicle floor in the vicinity of the driver's seat. A fuel injection valve (not shown) for supplying fuel to the engine is provided at an appropriate portion of the air intake passage 12 in the vicinity of the combustion chamber (not shown). The intake air mixed with the fuel enters the combustion chamber and, after being compressed by a piston (not shown), is ignited by a spark plug (not shown). The fuel-air mixture burns explosively and drives the piston. The motive force of the piston is converted into rotating motion which is made available at an engine output shaft 18.

The stage following the main engine unit 10 is a transmission 20 comprising a torque converter 22 and a gear box 24 constituted of planetary gears and the like. The torque converter 22 comprises a pump impeller 22a, a turbine runner 22b, a cover (shell) 22c and a stator 22d. The pump impeller 22a is connected with the output shaft 18 via the cover 22c and the turbine runner 22b is connected with the main shaft 26 (input shaft) of a gear box 24. The gear box output shaft (propeller shaft) 28 is connected via a differential ential 30 with drive shafts (half shafts) 32, whereby the motive force obtained by speed-adjustment of the engine output is transmitted to the drive wheels 34. The torque converter 22 is equipped with a lock-up clutch 40.

Figure 2:
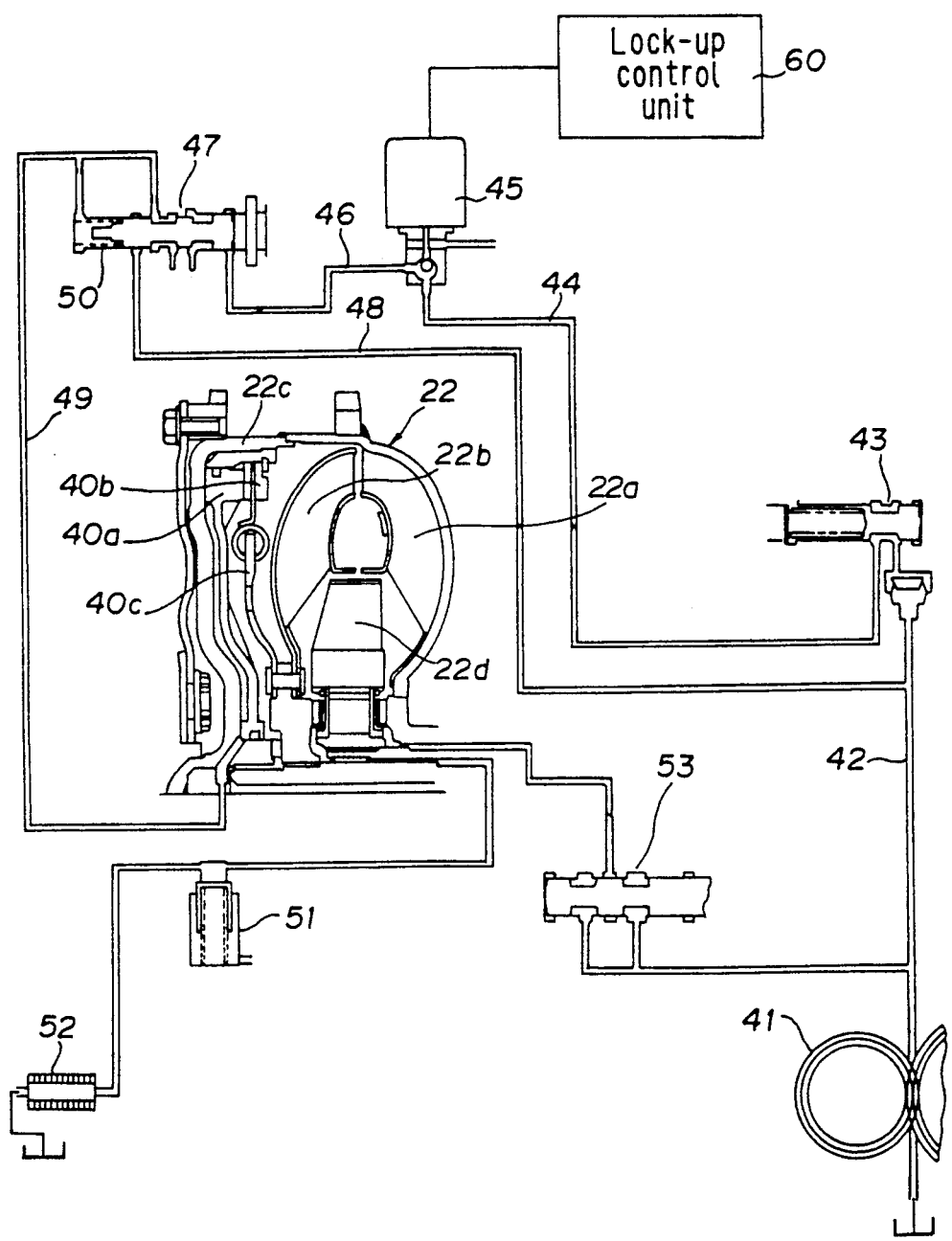
FIG. 2 is an enlarged sectional view of a torque converter with the lock-up clutch shown in FIG. 1 and including the hydraulic circuit of the lock-up clutch control.

FIG. 2 is a diagram showing the hydraulic circuit of the lock-up clutch 40. Line pressure delivered by an oil pump 41 is forwarded through a line 42 to a modulator valve 43 which adjusts it to a modulator pressure which is supplied through a line 44 to a solenoid valve (duty solenoid) 45. The solenoid valve 45 adjusts the modulator pressure to a duty pressure proportional to a duty value (ratio) and forwards it through a line 46 to a lock-up controller valve 47 which is urged thereby to the left in the drawing. The resulting movement of the lock-up controller valve 47 to the left allows line pressure forwarded through a line 48 to pass to a line 49. And this pressure, acting together with the force of a spring 50, causes the lock-up controller valve 47 to be pushed back to the right. As a result, the pressure in the line 49 becomes proportional to the duty pressure. Specifically he hydraulic pressure is high when the duty pressure is high and is low when the duty pressure is low.

The lock-up clutch 40 comprises a piston 40a, a facing 40b adjacent to the piston 40 a and integrally formed with the cover 22c (and the pump impeller 22a), and a clutch disc 40c inserted in a recess of the facing 40b. The hydraulic pressure of the line 49 sent to the torque converter 22 is supplied between the cover 22c and the piston 40 a where it acts as a back pressure to force the piston 40a to the right in the drawing. On the other hand, a hydraulic pressure regulated to a fixed magnitude by a check valve 51 is supplied to between the lock-up clutch 40 and the turbine runner 22b as an internal pressure. Depending on the magnitude of the difference between the internal and back pressures, the lock-up clutch 40 assumes engaged (to mechanically couple the pump impeller 22a and the turbine runner 22b), disengaged and slip states. A lock-up control unit 60 PWM (pulse width modulation) controls a solenoid valve 45 to a duty ratio within the range of 0-100%, thereby controlling the aforesaid duty pressure so as control the back pressure to the required value. The states assumed by the lock-up clutch depending on the relationship between the back and internal pressures are:

Engagement: Back pressure > internal pressure (very high duty pressure)

Disengagement: Back pressure < internal pressure (very low duty pressure)

Slip: Speed ratio varies and clutch slips depending on size of pressure difference.

The back pressure is made inversely proportional to the duty ratio. Specifically, when the duty ratio is 0% the back pressure is 8 [kg/cm$^2$] and when it is 100% the back pressure is 0 [kg/cm$^2$]. In other words, the lock-up is progressively released with increasing duty ratio to become completely disengaged at a duty ratio of 100%. Reference numeral 52 in FIG. 2 designates an oil cooler and 53 a regulator valve, Again returning to FIG. 1, in the vicinity of the throttle valve 16 of the air intake passage 12 there is provided a throttle position sensor 62 such as a potentiometer or the like for detecting the degree of opening of the throttle valve 16. In the vicinity of a rotating member (e.g. a distributor; not shown) of the main engine unit 10 there is provided a crankshaft angle sensor 64 such as an electromagnetic pickup or the like. The crankshaft angle sensor 64 detects the position of the piston in terms of the crankshaft angle and produces a signal once every prescribed number of degrees of crankshaft rotation. At an appropriate location downstream of the throttle valve 16 of the air intake passage 12 there is provided an intake air pressure sensor 66 for detecting the absolute pressure of the intake air. In the vicinity of the brake pedal (not shown) provided on the vehicle floor in the vicinity of the driver's seat there is provided a brake switch 68 for detecting depression of the brake pedal. At an appropriate location near one of the drive shafts 32 there is further provided a vehicle speed sensor 70 such as a reed switch or the like for detecting the vehicle road speed. In addition, an ATF (automatic transmission fluid) temperature sensor 72 is provided in the automatic transmission 20 for detecting the ATF temperature and a turbine speed sensor 74 is provided at an appropriate position on the main shaft 26 for detecting the turbine (runner) speed. The outputs of the sensors 62, 64, 66, 68, 70, 72 and 74 are sent to the lock-up control unit 60. Another control unit, the gear-shift control unit 80, is provided for controlling the gear ratio (gear position) of the gear box via a shift valve 82. However, as the invention is characterized by lock-up control, not by gear ratio control, the gear-shift control unit 80 will not be explained in detail.

Figure 3:
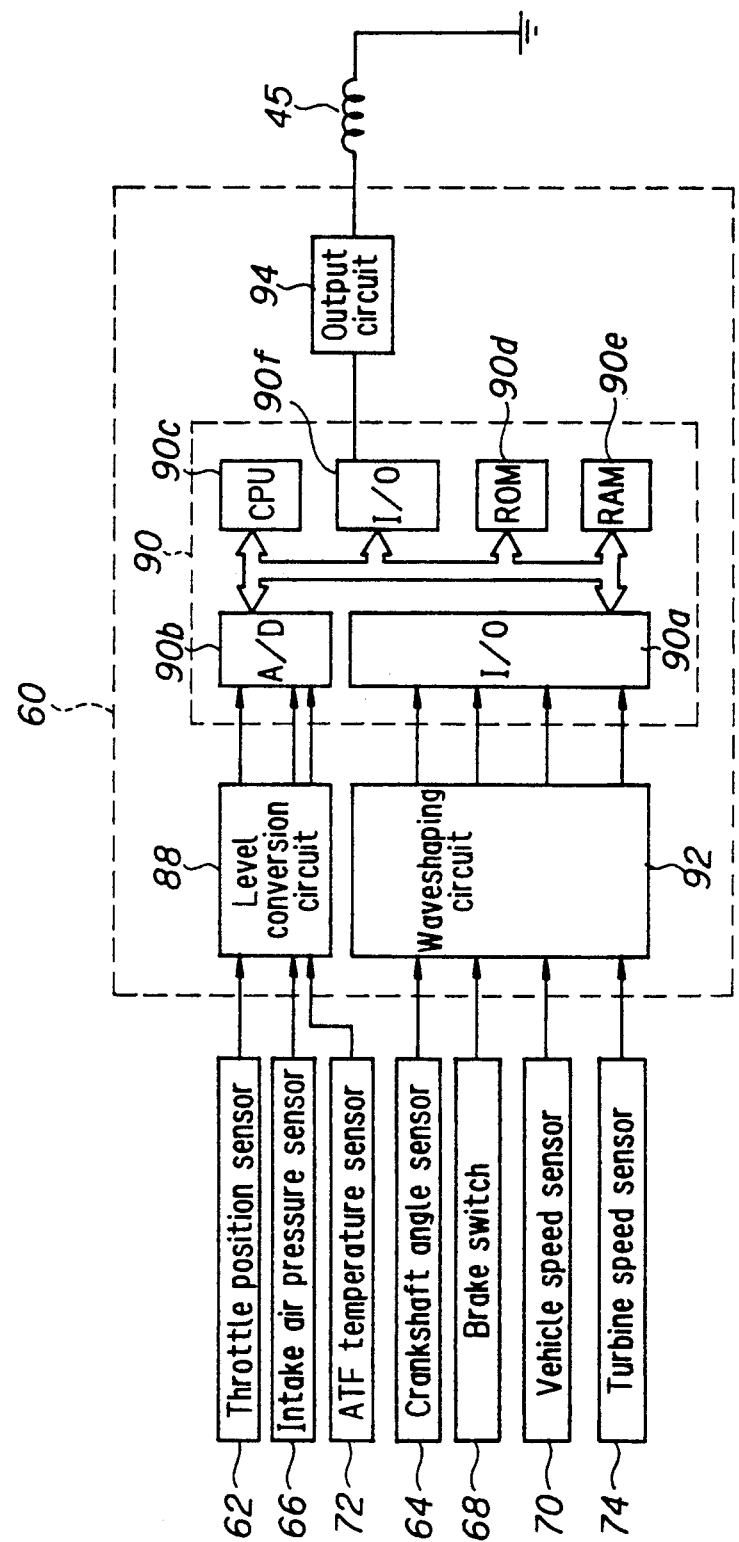
FIG. 3 is a block diagram showing the details of the lock-up clutch control unit shown in FIG. 1.

FIG. 3 is a block diagram showing the lock-up control unit 60 in detail. As shown in this figure, the analog outputs from the throttle position sensor 62 and the like are input to a level conversion circuit 88 in the lock-up control unit 60 for amplification and the amplified signals are forwarded to a microcomputer 90. The microcomputer 90 has an input port 90a, an A/D (analog/digital) converter 90b, a CPU (central processing unit) 90c, a ROM (read-only memory) 90d, a RAM (random access memory) 90e, an output port 90f and groups of registers (not shown) and counters (not shown). The output from the level conversion circuit 88 is input to the A/D converter 90b whereby it is converted into digital values, and the digital values are stored in the RAM 90e.

The outputs from the crankshaft angle sensor 64 and the like are first waveshaped in a waveshaping circuit 92 and then input to the microcomputer through the input port 90a to be stored in the RAM 90e. On the basis of the measured values and various calculated values derived therefrom, the CPU 90c decides the duty ratio control value. The result of the decision is sent through the output port 90f to an output circuit 94 which energizes/deenergizes the solenoid valve 45 so as to control the operation of the lock-up clutch according to the target value.

The operation of the control system will now be explained with respect to the flow charts of FIG. 4 and later figures.

Before going into a detailed description, however, the general features of the control system will first be explained with reference to FIG. 5. The system according to the invention has two fuzzy reasoning sections connected in series. The first fuzzy reasoning section decides the target speed ratio and the second fuzzy reasoning section feedback controls the duty ratio of the solenoid valve 45 for realizing the target speed ratio. The speed ratio e referred to here is the speed of the turbine shaft of the torque converter 22 divided by the speed of the pump shaft thereof. In the system according to the invention, the target speed ratio is calculated by first obtaining the speed ratio change delta e from the input parameters through fuzzy reasoning using fuzzy production rules and then adding the result to the actual speed ration:

Target speed ratio en = Speed ratio change delta e
Current speed ratio en − 1 where n and n−−1 indicate the values calculated (sampled) in the current and preceding cycles. Similarly, the target duty ratio is obtained as:

Target duty ratio DUTYn = Duty ratio change delta
DUTYn + Current duty ratio DUTYn−1 [%]

Another feature of the system is that the number of fuzzy production rules used is minimized by organizing the rules hierarchically in line with an analysis of the vehicle operating states based on the decision-making process of human drivers. Specifically, three categories of rules are defined: basic rules of a general type that apply to all driving states, extra rules that apply to special, limited driving states and restrictive metarules that stipulate prohibited conditions. The target speed ratio decided on is thus checked in the light of the metarules. The set of rules used in the first fuzzy reasoning section for deciding the target speed ratio are shown in FIGS. 6–8 and the set of rules used in the second fuzzy reasoning section for determining the target duty ratio (operation amount) are shown in FIGS. 9–11. The target values are obtained from the parameters included in the rule sets by fuzzy reasoning using membership functions.

Figure 4:
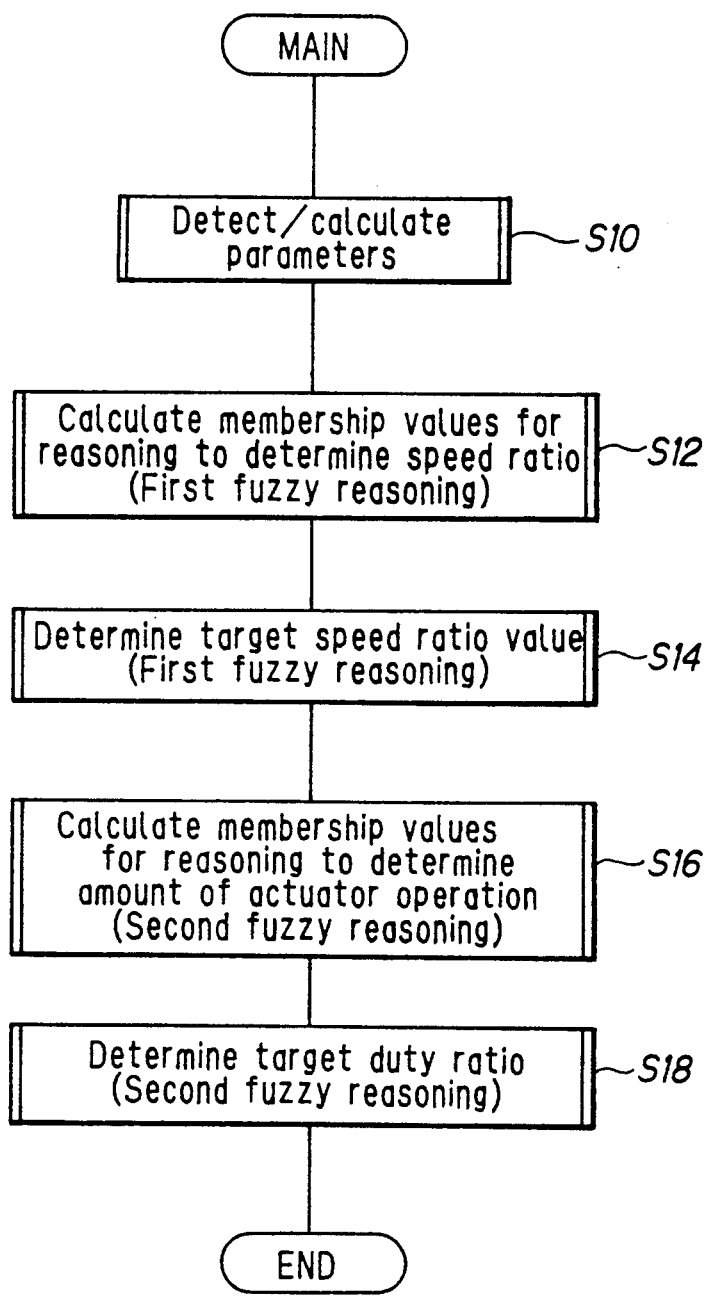
FIG. 4 is a main routine flow chart showing the operation of the lock-up clutch control unit shown in FIG. 3.

As shown in FIG. 4, the parameters used by the rule sets are first detected/calculated in step S10. As will be understood from FIGS. 6–8, the parameters used in the first fuzzy reasoning section are the throttle opening θTH [0°–84° (WOT)], the current speed ratio e, the torque converter turbine speed NT (rpm), the grade resistance (kg), the ATF temperature (°C.), the tire speed (rpm) and the tire speed change (rps). As is clear from FIGS. 9–11, the parameters used in the second fuzzy reasoning section are the speed ratio deviation E, the speed ratio deviation change delta E and the ATF temperature (°C.).

The speed ratio deviation E is defined as:

Speed ratio deviation E = Target speed ratio en
 − Current speed ratio en − Current speed ratio
 en − a and the speed ratio deviation change delta E is defined as:

Speed ratio deviation change delta E = En − b
 (deviation sampled in the preceding cycle) − En
 (deviation sampled in the current cycle)

where delta square E indicates the second difference. The suffixes a and b can indicate either the value calculated one cycle earlier or a value calculated several cycles earlier. Since the response of the speed ratio change is relatively slow, it is better to use values calculated several cycles earlier than to use those calculated in the preceding cycle.

Figure 12:
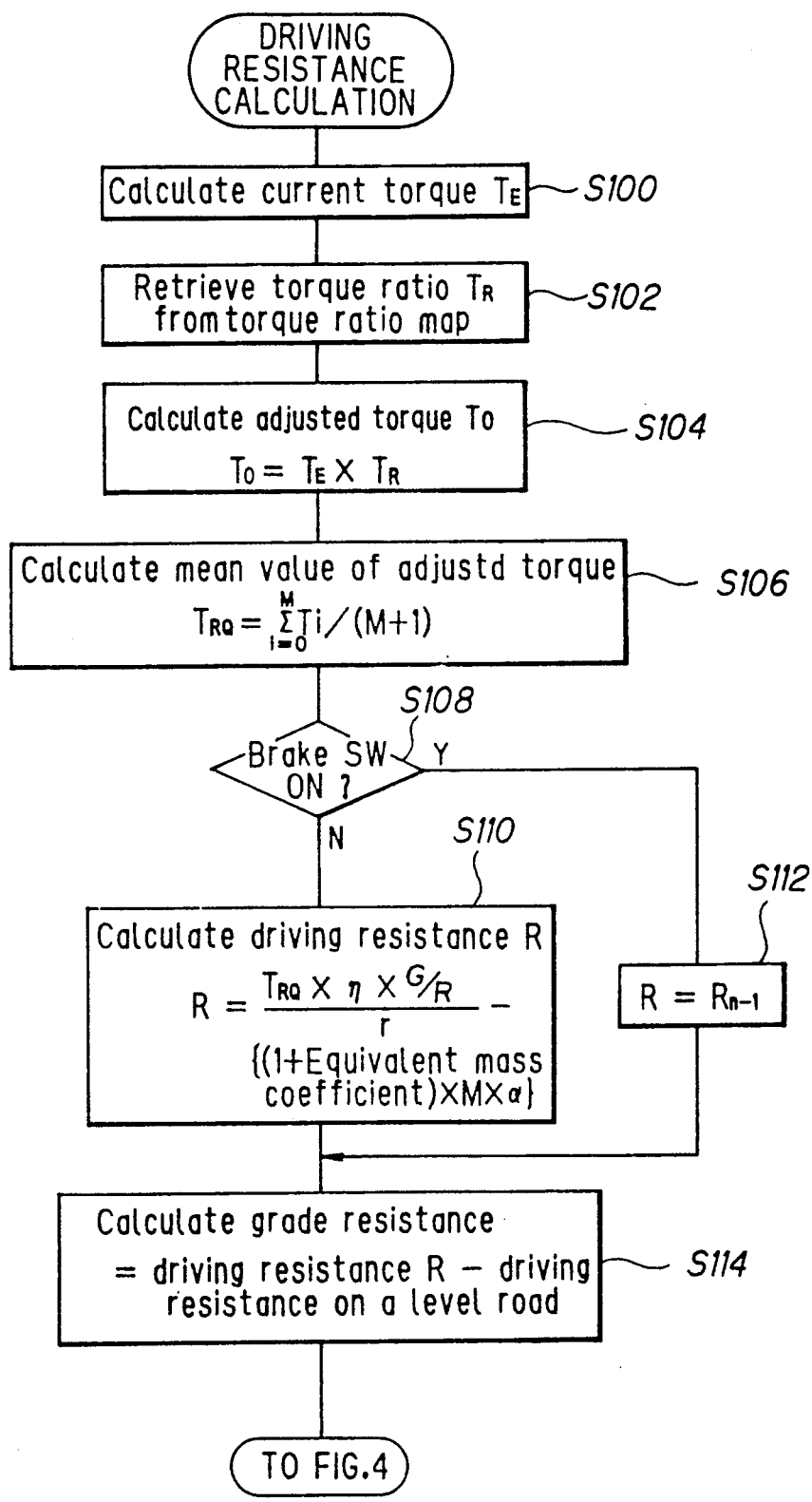
FIG. 12 is a subroutine flow chart showing driving resistance calculation referred to in FIG. 3 flow chart.

The throttle opening θTH is obtained from the sensor detection value, the actual speed ratio e by dividing the turbine speed NT (sensor detection value) by the engine speed (calculated by counting the number of pulses output by the crankshaft angle sensor 64 per prescribed time period), and the ATF temperature from the sensor detection value. While the speed ratio deviation E and the speed ratio deviation change delta E are obtained as explained above, the grade resistance is calculated by a special method which will now be explained with reference to FIG. 12.

The procedure this starts with step S100 in which the current torque TE is calculated as Current torque = (716.2 × Actual
 horsepower)/Engine speed [kg·m]

Figure 13:
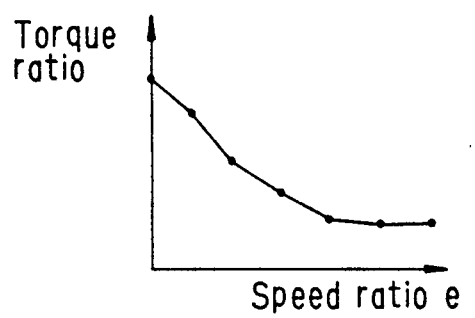
FIG. 13 is a graph explaining the characteristics of a torque ratio defined with respect to a speed ratio and referred to in FIG. 12 flow chart.
Figure 14:
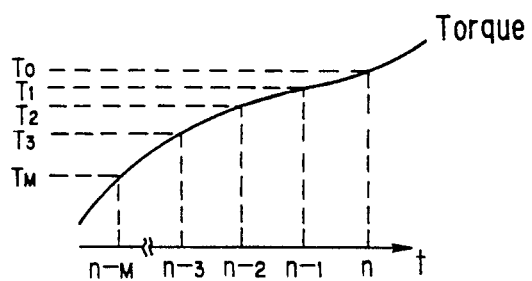
FIG. 14 is a graph explaining mean torque calculation referred to in FIG. 12 flow chart.

The actual horsepower is obtained, for example, by retrieval from a map stored in the ROM 90d beforehand, using the engine speed and the intake e air pressure as address data. In the equation, 716.2 is the constant conventionally used for converting horsepower to torque. Following the calculation of the current torque TE in step S100, control passes to step S102 in which a torque ratio TR indicating of the torque increases by the torque converter 22 is retrieved from a map, the characteristics of which is shown in FIG. 13, to step S104 in which the torque calculated in step S100 is multiplied by the value retrieved in step S102, and the step S106 in which the mean value of the adjusted torque is calculated. This adjustment here is made to compensate for the fact there is some time delay between a change in the throttle opening and the time that the change is reflected in the engine output. FIG. 14 shows how the mean value is calculated. After confirming that braking is not being conducted in step S108, control passes to step S110 in which the driving resistance R is calculated as follows:

Driving resistance R = [(Means torque
 TRQ × Transmission efficiency eta × Overall gear
 ratio G/R/)/Effective tire radius
 r) − {(1 + Equivalent mass) × Vehicle mass
 M × Acceleration a] [kg]

The transmission efficiency eta, overall gear ratio G/R, effective tire radius r, equivalent mass (equivalent mass coefficient) and vehicle mass M (Ideal value) are obtained and stored in the ROM 90d in advance.

This reason for calculating the driving resistance in the foregoing manner will now be explained.

The vehicle dynamics can be obtained from the law of motion as

Motive force F − Driving resistance
 R = (1 + Equivalent mass) × (Vehicle weight
 W/Gravitational acceleration G) × Acceleration
 a [kg]    (1)

where
 Motive force F = (Torque (mean) TRQ × Overall gear ratio G/R × Transmission efficiency eta)/Effective tire radius r [kg]
 Driving resistance R = (Rolling resistance μ0 + Grade sin θ) × Vehicle gross weight Wr + Aerodynamic drag (μA × V²) [kg]

The variables in the foregoing equations are the vehicle gross weight Wr, which varies with the number of passengers and the amount of cargo, and the grade sin θ, which differs depending on the inclination of the road surface, and all of these factors are included in the driving resistance. (V represents the vehicle speed.) Therefore, by rewriting the aforesaid equation (1) there is obtained Driving resistance R = (Motive force
 F) − {(1 + equivalent mass) × Vehicle mass
 M × Acceleration a} [kg]

(where vehicle mass M = vehicle weight W/gravitational acceleration G).

If it is found in step S108 that braking is being conducted, since the braking force makes it difficult to calculate the driving resistance with accuracy, control is passed to step S112 in which the value calculated in the preceding cycle is used.

Figure 15:
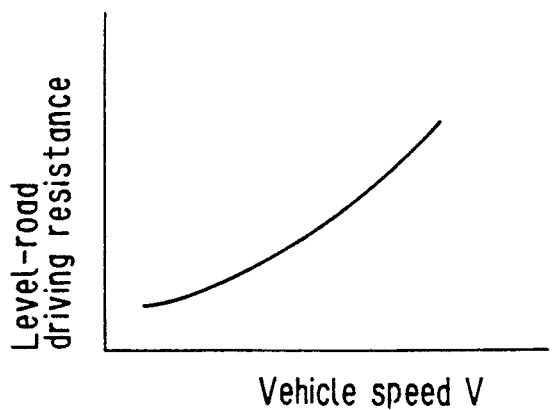
FIG. 15 is a graph explaining the characteristics of driving resistance on a level road defined with respect to a vehicle speed and referred to in FIG. 12 flow chart.

Control then passes to step S114 in which the grade resistance is calculated by subtracting the level-road driving resistance from the driving resistance value obtained in the foregoing manner. (Since the driving resistance is the sum of the rolling resistance, aerodynamic drag, grade resistance and acceleration resistance and the driving resistance value obtained in step S110 includes all of these other than the acceleration resistance, it is possible to get the grade resistance by subtracting the level-road driving resistance from said value. The level-road driving resistance is obtained by tests and stored in the ROM 90d in advance. It has the characteristics shown in FIG. 15 and is retrieved for the calculation using the vehicle speed V as address data.

All of the aforesaid parameters are measured or calculated in step S10 of the flow chart of FIG. 4. For facilitating this processing, the parameters are assigned parameter numbers (1-19) in advance as shown in FIG. 16, and are thereafter identified by their parameter numbers. In addition, the membership functions for each parameter are assigned six function numbers (1-76) in order to simplify the processing. For example, the throttle opening $\theta$TH, which is used in rules 1, 2, 5 and 6, uses only three types of membership functions, namely the fuzzy set rising to the right shown for rule 1, the fuzzy set falling to the right shown for rule 2 and the pointed fuzzy set shown for rule 6. Thus, these three types of membership functions are specified by function numbers 1-3. It should be noted that function numbers 4-6 have no content. Since the metarules 9 and 10 are used for final checking, as will be explained further later, the tire speed and the tire speed change used in these rules are not assigned parameter numbers.

Control then passes to step S12 in which the membership values used in the reasoning for deciding the speed ratio of the torque converter are calculated and then to step S14 in which the target speed ratio is calculated. This will be explained further with reference to FIGS. 6-8. As was mentioned earlier, the system according to the invention conducts fuzzy reasoning using fuzzy production rules. As indicated in FIGS. 6-8 (and FIGS. 9-11), each rule consists of a premise (an IF part or antecedent) and a conclusion (THEN part or consequent), which is to say that it is written in the form of If . . . , then . . . In FIGS. 6-8, rules 1-4 are basic rules relating to ordinary driving, rules 5-8 are extra rules relating to special driving such as hill-climbing, and rules 9 and 10 are metarules of a restrictive nature.

Turning to the individual rules, rule 1 states that if the throttle opening is large and the (current) torque converter speed ratio is large, the torque converter speed ratio is to be made smaller. This rule is established because depression of the accelerator pedal indicates the driver's desire to accelerate and for satisfying this desire, it is necessary to lower the speed ratio so as to increase the torque. (The speed ratio approaches 1.0 with increasing lockup clutch engagement and becomes 1.0 at full engagement.) It will be noted that the value of the conclusion membership function is maximum at $-1.0$. This indicates that the torque converter speed ratio is to be adjusted greatly in the negative direction, i.e. in the disengagement direction. As will be explained further later, the conclusions of the rules are weighted and averaged and the so-obtained mean value is added to the current speed ratio to obtain the final target speed value. However, since the metarules shown in FIG. 5 (and rules 9 and 10 in FIG. 8) are of a restrictive nature, they are not weighted or averaged but are used as they are for finally checking the target speed ratio. This will be explained in detail below.

Rule 2 stipulates that under conditions the opposite from those premised by rule 1, the lock-up clutch is to be engaged for increasing fuel economy. Rule 3 stipulates that when the turbine speed is high, the torque converter speed ratio is to be made large. The thinking behind this is that a high turbine speed, i.e. a high vehicle speed, means that the engine speed is high and driving is possible without a torque increase, so that the torque converter speed ratio should be increased, which is also appropriate from the point of minimizing vehicle vibration. Rule 4 relates to the opposite situation. Rule 5 stipulates that if the throttle opening is large during hill-climbing, then the torque converter speed ratio should be made small. This is for increasing the motive force. Rule 6 states that if the accelerator pedal is released and the torque converter speed ratio is very large, then the torque converter speed ratio is to be made small. This comes from the fact that when the torque converter speed ratio becomes very large and exceeds 1.0, the engine is forcibly rotated by the wheels so that the deceleration the driver expects should be enhanced by maintaining the engine braking effect, while the lock-up clutch is held in an engaged state. One reason for adjusting the torque converter speed ratio in the direction of clutch disengagement in this case is that since the actual torque converter speed ratio is very large, i.e. greater than 1.0, it can be expected to remain in the vicinity of 1.0 ($e\approx 1.0$) even if adjusted in the direction of clutch disengagement, and another even more important reason is that the adjustment is required for coping with rapid braking such as conducted in a panic and the like discussed later in connection with the metarules. This comes from the fact that e tends to become larger than 1 during deceleration and where $e=1$ the engine is liable to stall or stop during such a rapid braking on a snow surface or the like owing to a lock-up disengagement delay. For avoiding this, rule 6 was formulated for improving the disengagement response by producing a small amount of slip ($e\approx 1.0$). Rule 7, which calls for the torque converter speed ratio to be increased when the ATF temperature is high, is established to prevent further temperature increase by lowering heat generation, which increases in proportion to torque converter slip. The reason for stipulating in rule 8 that the torque converter speed ratio is to be made smaller when the ATF temperature is low is to counteract the tendency for the high viscosity of low-temperature ATF to increase transmission of engine vibration and give rise to vehicle vibration. Skipping rule 9 for the moment, in rule 10 the idea behind disengaging the lock-up clutch when change in the tire speed is very large in the negative direction is to prevent stalling of the engine when the wheels are locked, as may happen for example during rapid braking on snow. Rule 9 is for backing up rule 10 in a case where the rapid braking is not detected for some reason.

In steps S12 and S14, the detected parameters relating to the antecedent (IF part) of each rule are applied to the corresponding membership functions, the values (called membership values or membership grades) at the positions on the vertical axes corresponding to the points of intersection are read, and the smallest of the values is taken as the degree of satisfaction of the rule. Next, the output value of the consequent of each rule is weighted by the degree of satisfaction of its antecedent and the weighted mean of the outputs of all of the consequents is calculated to obtain the final output. The calculation of the membership values in step S12 starts with calculation of membership values for the parameters used in the rule set and the association of the calculated values with the corresponding function numbers. As shown by the specific example in FIG. 16, this would mean, for instance, beginning the association of values and function numbers by reading the value 0.3 for function number 1.

Figure 17:
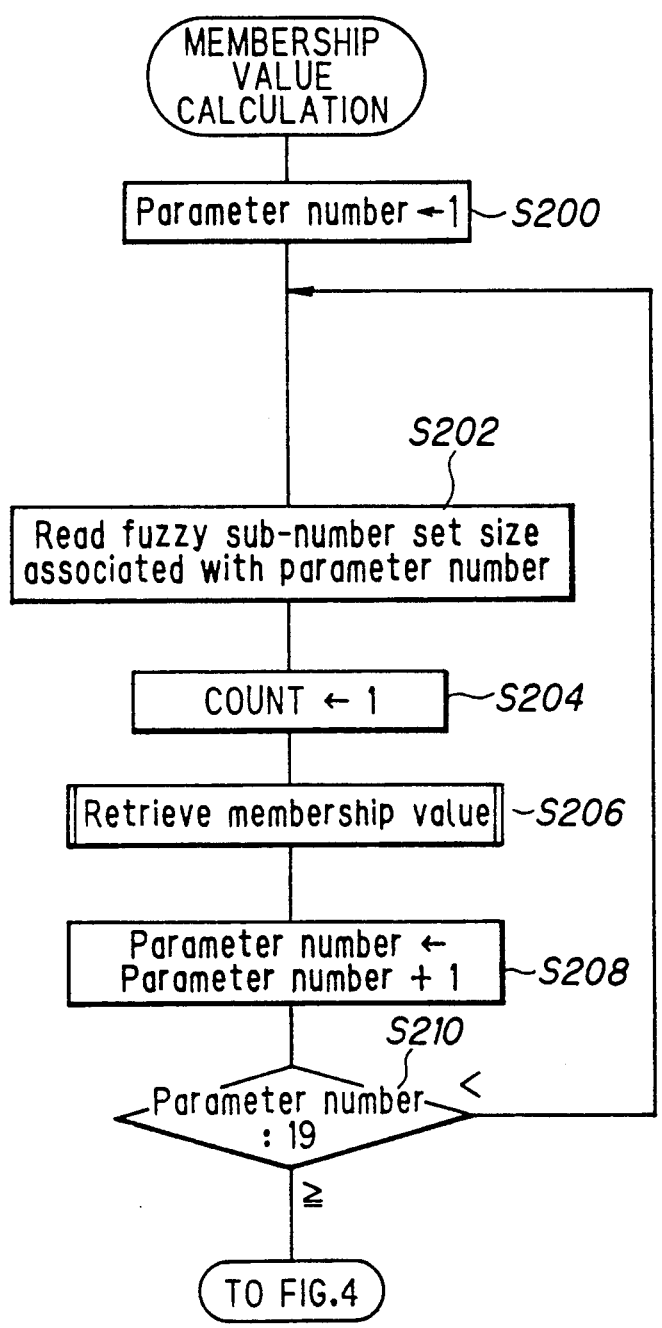
FIG. 17 is a subroutine flow chart showing membership value calculation referred to in FIG. 4 flow chart.

FIG. 17 is a flow chart showing a subroutine for calculating the membership values. The subroutine starts with the step S200 in which initialization is conducted for setting the parameter number to 1 (throttle opening). Control then passes to step S202 for reading out the size of the fuzzy sub-number set associated with this parameter number, namely, the number of different membership functions in which the parameter is used (three in the case of the throttle opening). Then in the following step S204, the count value of a counter COUNT for counting the size of the fuzzy sub-number set is initialized by setting to 1, whereafter the membership value is retrieved in step S206.

Figure 18:
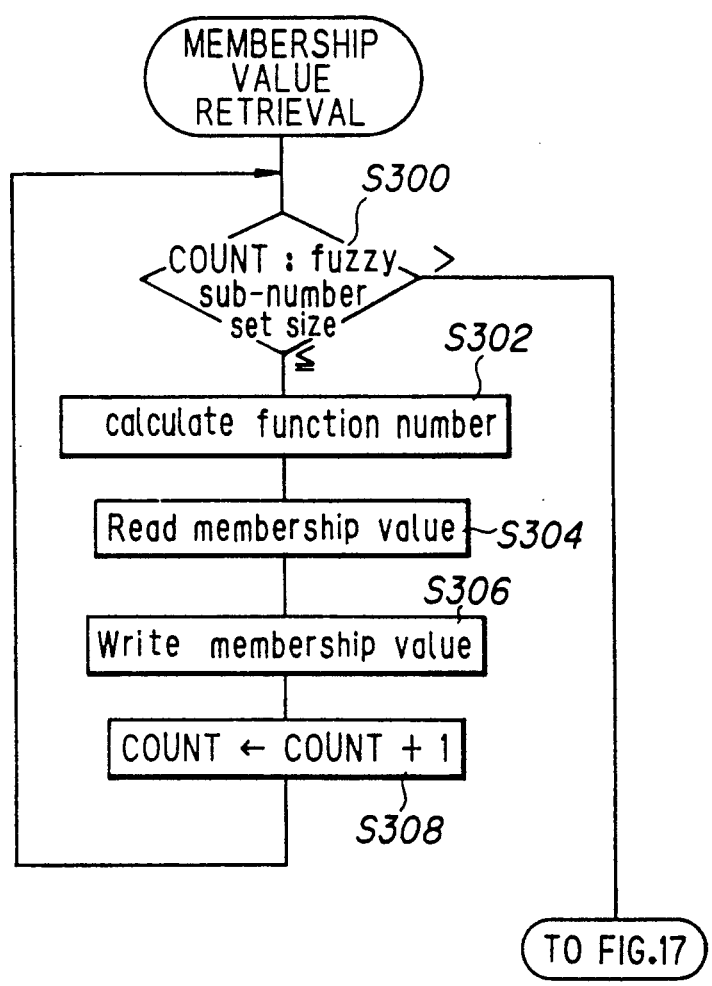
FIG. 18 is a subroutine flow chart showing membership value retrieval referred to in FIG. 17 flow chart.

The flow chart of FIG. 18 indicates the subroutine for this retrieval. First, in step S300, the count value is compared with the size of fuzzy sub-number set. In the first cycle, the count value is naturally found to be smaller than the sub-number set so that control passes to step S302 in which the function number is calculated as (6×(Parameter number−1)+COUNT), to step S304 in which the membership value is read, to step S306 in which the read value is written to an appropriate address in the RAM 90e, and finally to step S308 in which the value of COUNT is incremented. This process is repeated until it is found in step S300 that the value of COUNT has exceeded the size fuzzy sub-number set, and when this happens, control returns to the subroutine of FIG. 17 where, in step S208, the parameter number is incremented and the same processes is repeated. When it is found in step S210 that the parameter number has become 19 or larger, the subroutine is terminated.

Since the foregoing procedure results in the detection/calculation of the membership values (aside from those of the metarules) with respect to all parameters, control reverts to the subroutine of FIG. 4, passing to step S14 in which the target speed ratio is decided.

Figure 19:
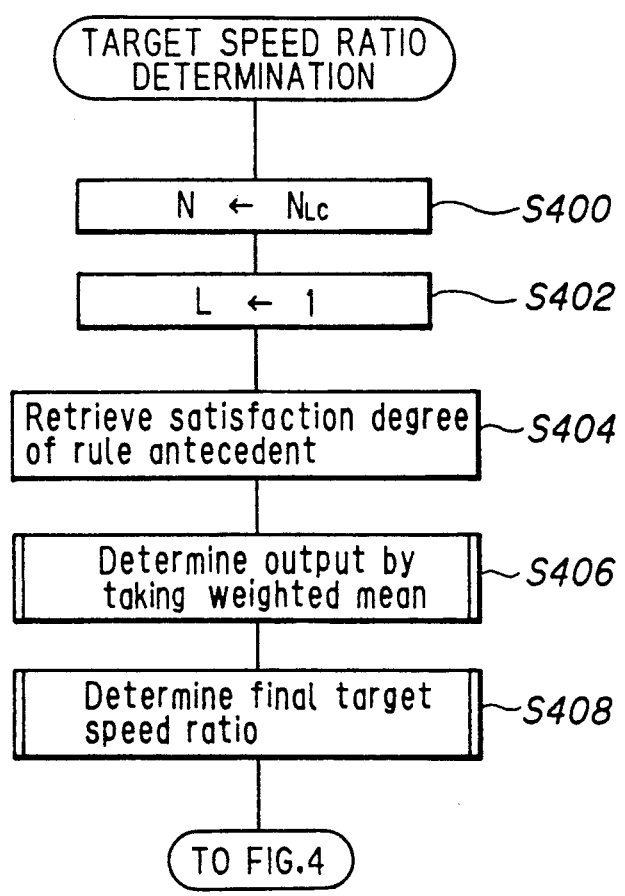
FIG. 19 is a subroutine flow chart showing target speed determination referred to in FIG. 4 flow chart.

FIG. 19 shows the subroutine for deciding the target speed ratio. In the first step S400, the count value of a counter N is initialized by setting it to the number of rules required for the reasoning NLC (8 in this embodiment). In the following step S402, the count value of a counter L is initialized by setting it to the number of the first rule (=1).

Figure 20:
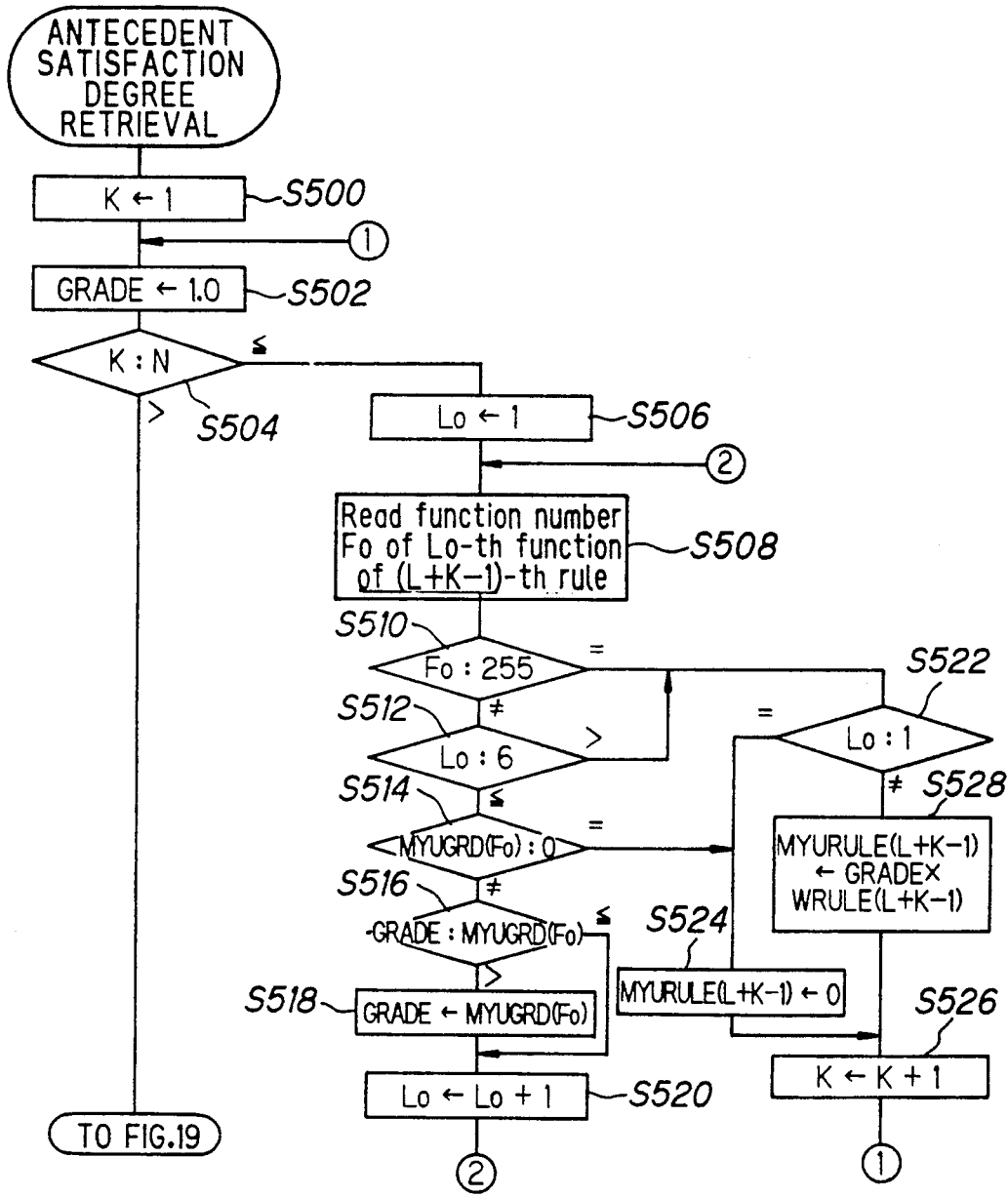
FIG. 20 is a subroutine flow chart of satisfaction degree retrieval of rule antecedent referred to in FIG. 19.

Control then passes to step S404 in which the degree of satisfaction of the antecedent is retrieved. This will be explained with reference to the subroutine of FIG. 20. In step S500, the count value of a counter K is set to the number of rules retrieved so far, namely to 1 the first time the subroutine is activated. Then in step S502 the value of GRADE indicating the minimum degree of satisfaction of the rule up to the present is initialized by setting it to an appropriate value such as 1.0. In the following step S504, the number of rules retrieved so far (K) is compared with the number of rules required for the reasoning (N).

Figure 21:
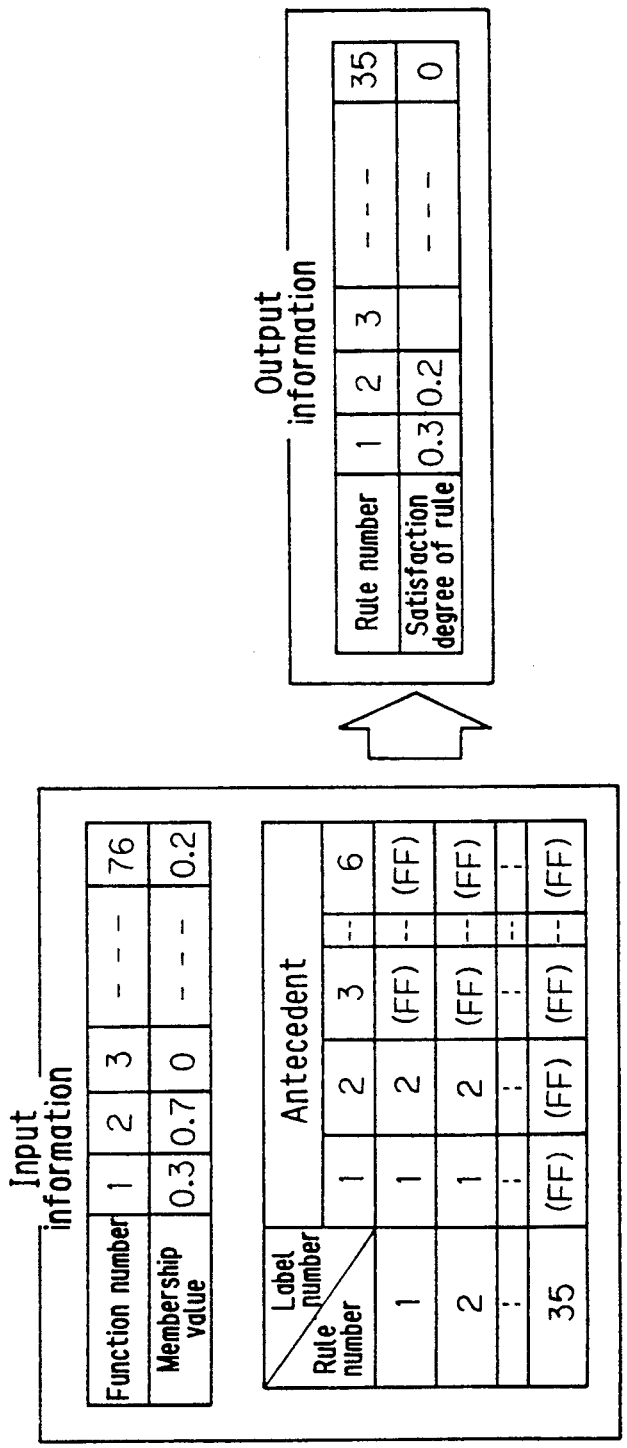
FIG. 21 is an explanatory view showing label number and the like referred to in FIG. 20 flow chart.

The first time this subroutine is activated, the relationship will of course be K<N so that the procedure advances to step S506 in which the count value of the rule antecedent label number counter LO of the currently retrieved rule is initialized by setting it to 1. In the following step S508, the function number FO of the (L+K−1)th rule is read. This will be better understood from FIG. 21. As shown in FIG. 21, the membership values corresponding to the function numbers have already been read, while the parameters used in the respective rules are progressively numbered (with the aforesaid label numbers). Taking rule 1 as an example, since the parameters used are the throttle opening $\theta$TH and the actual speed ratio e, the first throttle opening is assigned label number 1 and the first speed ratio is assigned the label number 2. Since rule 1 uses only two parameters, label number 3 and higher label numbers (up to a maximum of 6) are assigned an appropriate value FF, which can be 255, for example. In this way it is possible to associate the parameters of the respective rules with their membership values. Therefore, at the time of first activating the subroutine, the membership value (MYUGRD (Fo)) of the function number (+1) of label number 1 of the first (=L+K−1) rule is read in step S508.

Next, in step S510, the value of the function number is compared with a prescribed value, e.g. 255. As the result is of course negative, the procedure goes to step S512 in which the label number is compared with the maximum number (6). As this is a fail-safe type confirmation operation, the result is of course negative and control passes to step S514 where it is discriminated whether or not the value read in step S508 is equal to zero. If it is found not to be zero, control passes to step 516 in which it is compared with the value of GRADE (initial value 1), and if it is found to be smaller than the GRADE value, the value of GRADE is replaced with the value of MYUGRD (FO) in step S518 and this value is taken as the minimum degree of satisfaction up to this point. This label number is then incremented in the following step S520, whereafter the same procedures are repeated with respect to the next parameter (the speed ratio in case the case of rule 1).

Figure 22:
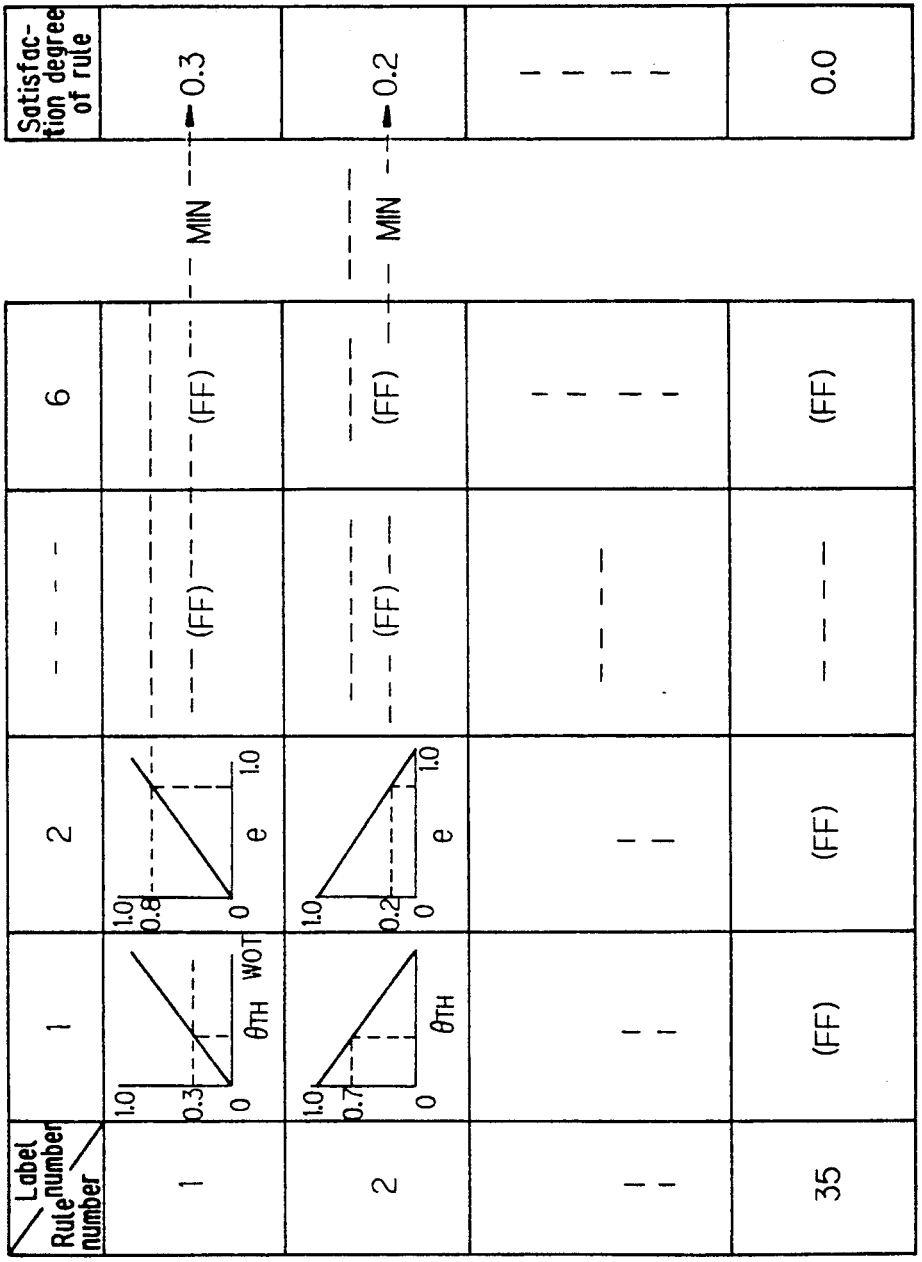
FIG. 22 is an explanatory view showing the relationship between the label number and the rule satisfaction degree.

In other words, as shown in FIG. 22, through these operations the membership values of the parameters for the respective rules are progressively retrieved and the minimum value for each rule is selected. In the case where the rule has no corresponding parameter, the membership value for the label number is assigned an appropriate value FF, e.g. 255, so that it is judged in step S510 that FO=FF and control passes to step S522 where it is judged whether or not the label number is 1. If the label number is 1, which means that no rule exists, control passes to step S524 where the degree of satisfaction MYURULE (L+K−1) for the rule is made zero and the next rule is taken up in step 526. (Provision is made for rule numbers up to 35.)

Otherwise control passes to step S528 where the GRADE value is defined as the degree of satisfaction of the rule and then to step S526 in which the rule number counter is incremented. In this way the degrees of satisfaction (minimum membership values) of the respective rules are progressively determined. When MYUGRD (FO) is found to be zero in step S514, there is no need to retrieve the membership value for the other parameters since the minimum value for the rule will naturally be zero irrespective of what the other membership values may be. In the interest of simplicity in processing, therefore, step S524 is skipped in such cases.

Returning to FIG. 19, control passes to step 406 in which the output is decided by taking the weighted mean.

Figure 23:
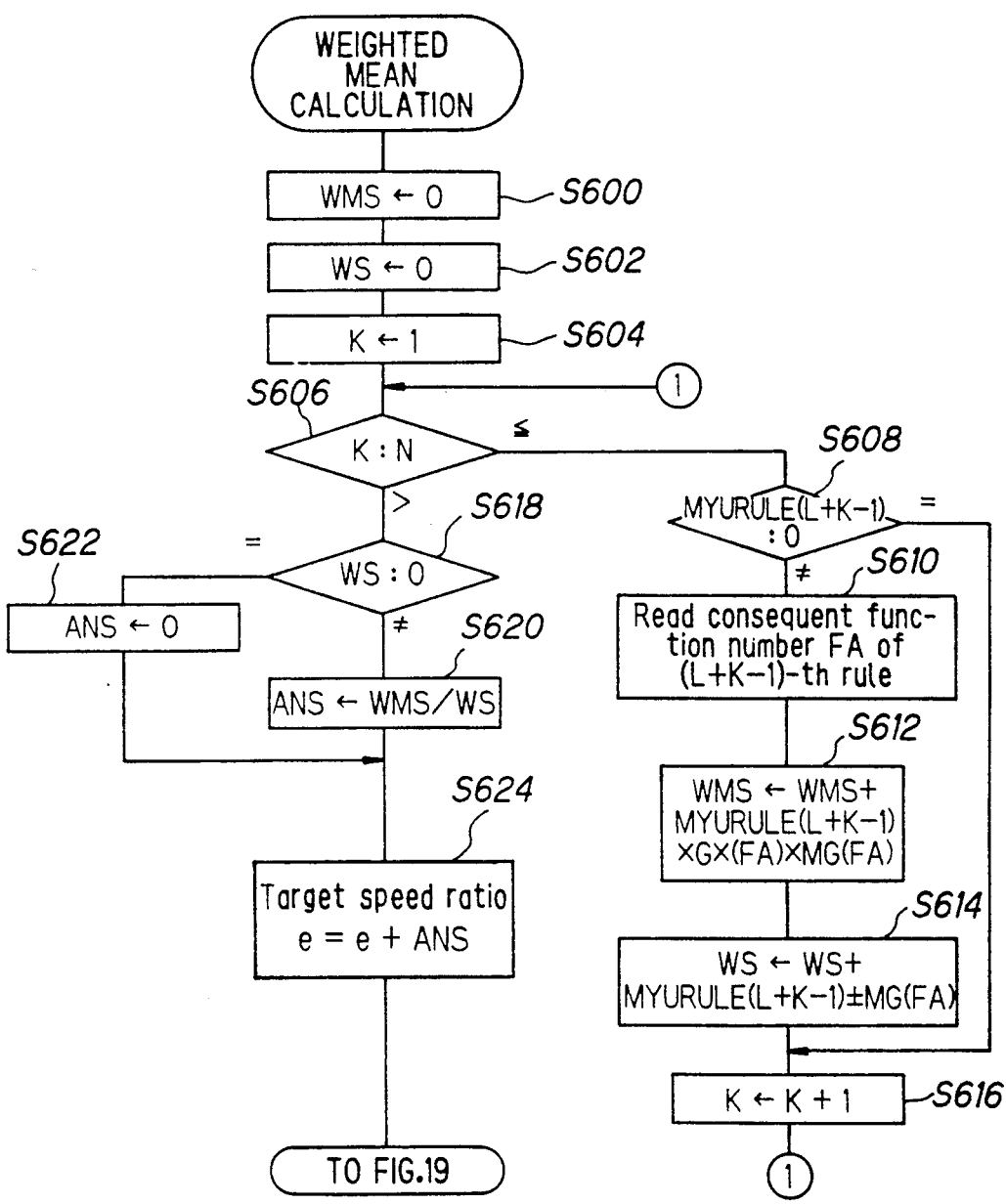
FIG. 23 is a subroutine flow chart showing weighted mean calculation referred to in FIG. 19 flow chart.

The processing for this is shown in FIG. 23. First, in steps S600 and S602, the values of WMS and WS stored in the RAM 90e are initialized by setting them to zero. (These values will be explained later.) Control then passes to step S604 in which the count value of the rule number counter K is set to a value 1 (rule 1) and then to step S606 in which this set value is compared with the count value of the counter N indicating the total number of rules required for the reasoning. The first time this subroutine is activated, the relationship will of course be found to be K<N so that control passes to step S608 in which it is judged whether or not the degree of satisfaction of rule 1 retrieved earlier is zero.

Figure 24:
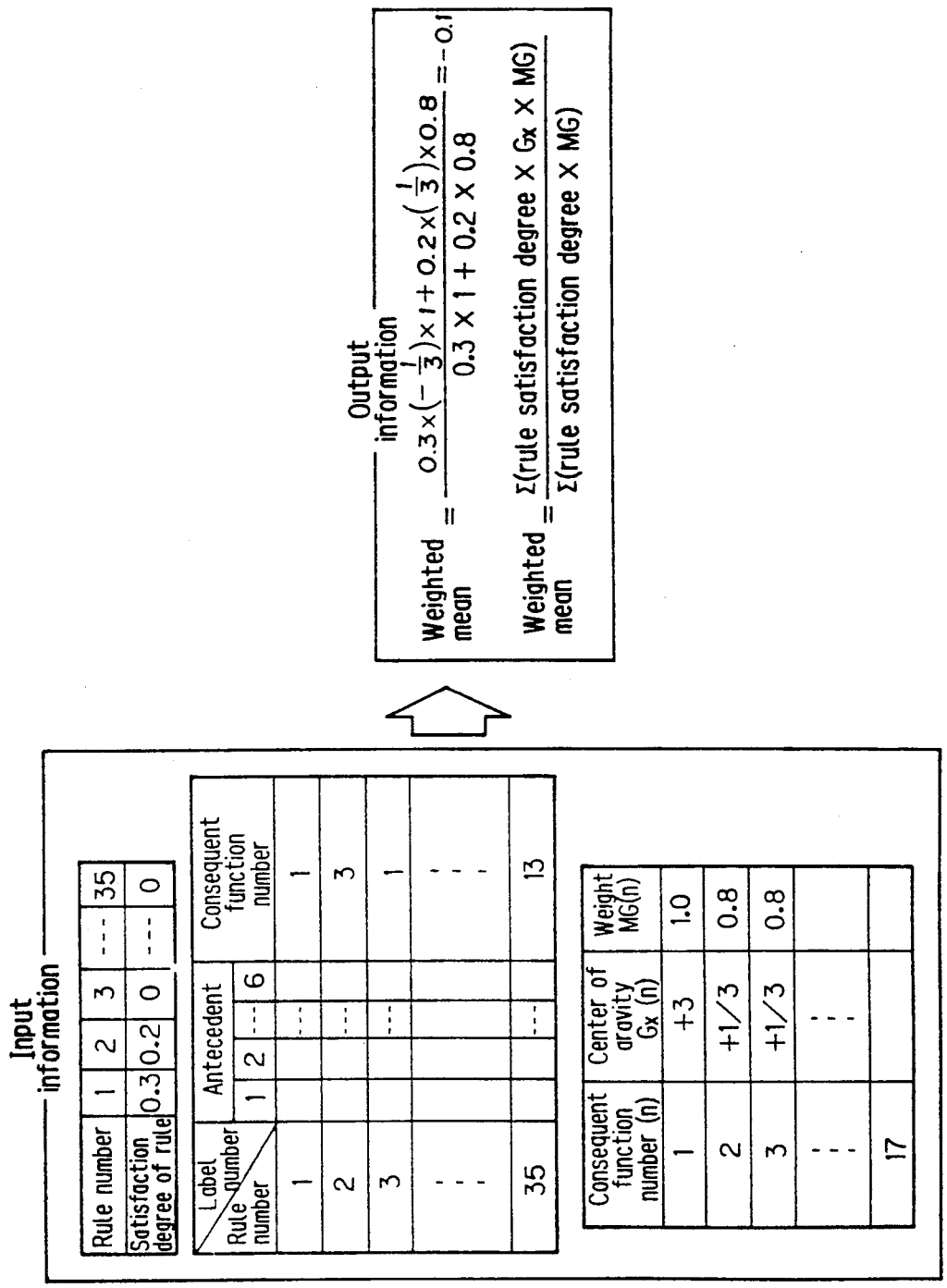
FIG. 24 is an explanatory view explaining the weighted mean calculation.

When it is found in step S608 that the retrieved value is not zero, control passes to step S610 in which the consequent number FA of the (L+K−1)th rule is read. In the case of rule 1, for example, the membership function has a waveform which, in line with the statement ". . . then make the speed ratio smaller," peaks at a conclusion of −1.0, as was mentioned earlier. The speed ratio conclusions, i.e. the center of gravity positions and weights, are separated into categories in advance by assignment of consequent function numbers as shown in FIG. 24.

Control then passes to step S612 in which the value of WMS to be stored in RAM is calculated, to step S614 in which the value of WS to be stored in RAM is calculated, and to step S616 in which the rule number counter is incremented. This will be explained with reference to FIG. 24. Assume, for example, that the degree of satisfaction of the antecedent is 0.3 in the case of rule 1 and is 0.2 in the case of rule 2. The center of gravity of the consequent of rule 1 becomes $-\frac{1}{3}$ and that of rule 2 becomes $+\frac{1}{3}$, while the weight thereof becomes 1.0 in the case of rule 1 and 0.8 in the case of rule 2. Therefore, as shown, the weighted mean becomes Weighted mean={Summation of each rule's degree of satisfaction MYURULE (L+K−1)×Center of gravity position Gx (FA) corresponding to the consequent function number×Weight MG (FA) at center of gravity corresponding to the consequent function number}/{Summation of each rule's degree of satisfaction MYURULE (L=K−1)×Weight MG (FA) at center of gravity corresponding to consequent function number}

Figure 25:
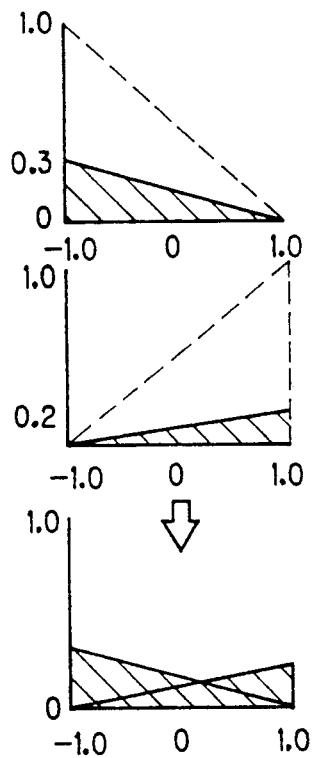
FIG. 25 is an explanatory view showing a concrete example of the weighted mean calculation.

As shown in FIG. 25, a simplified method for determining the weighted mean is used in this embodiment. Specifically, at the time of calculating the value of the consequent from the degrees of rule satisfaction, instead of truncating the triangular configurations at the positions concerned, triangular configurations (indicated by hatching) are formed having apices at these positions (at 0.3 and 0.2 in the illustrated example) and the resulting triangles are summed at the time of being transferred to a common universe of discourse. As shown in the figure, it is possible to realize a further simplification by using a fixed weighting.

In FIG. 23, WMS in step S612 corresponds to the numerator of the above equation while WS in step S614 corresponds to the denominator thereof. By repeatedly executing the steps S606-S616 in a loopwise manner while adding the value obtained during each loop to the total for the preceding loops, it is possible to obtain separate sums for the numerators and the denominators with respect to rules 1-8. When it is found in step S606 that the rule number has come to exceed the number of rules to be retrieved, the procedure moves to step S618 in which judgment is made as to whether or not WS is zero, and if the result is negative, WMS is divided by WS in step S620 to obtain the quotient ANS. If WS is found to be zero in step S618, the quotient ANS is set to zero in step S622. Control then passes to step S624 in which the quotient ANS ( delta e) is added to the current speed ratio e to obtain the target speed ratio.

Returning to FIG. 19, the procedure now advances to step S408 in which the final target gear speed ratio is decided.

Figure 26:
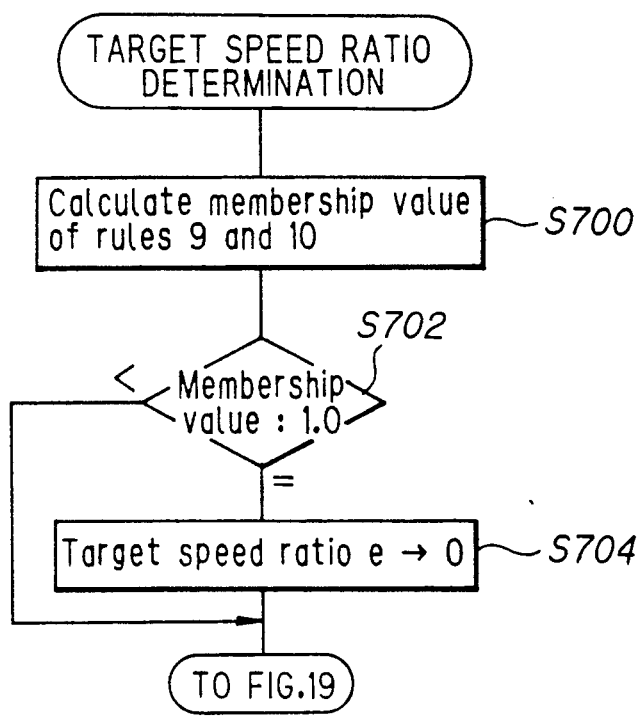
FIG. 26 is a subroutine flow chart showing final target speed ratio determination.

FIG. 26 shows a subroutine for making this decision. In the first step S700, the membership value of rules 9 and 10 is calculated. Control then passes to step S702 in which a discrimination is made as to whether the membership value calculated in step S702 is 1.0, and if it is, to step S704 in which the once-decided target speed ratio e is set to zero. If the result of the discrimination in step S702 is negative, the program is immediately terminated. This type of check is made in view of the fact that the metarules stipulate absolutely prohibited conditions. By carrying out the processing of the metarules independently of that for the other rules in this way, it is possible to give priority to absolute restrictions under specified conditions and thus possible to cope with rapid braking in a panic, for example.

Figure 5:
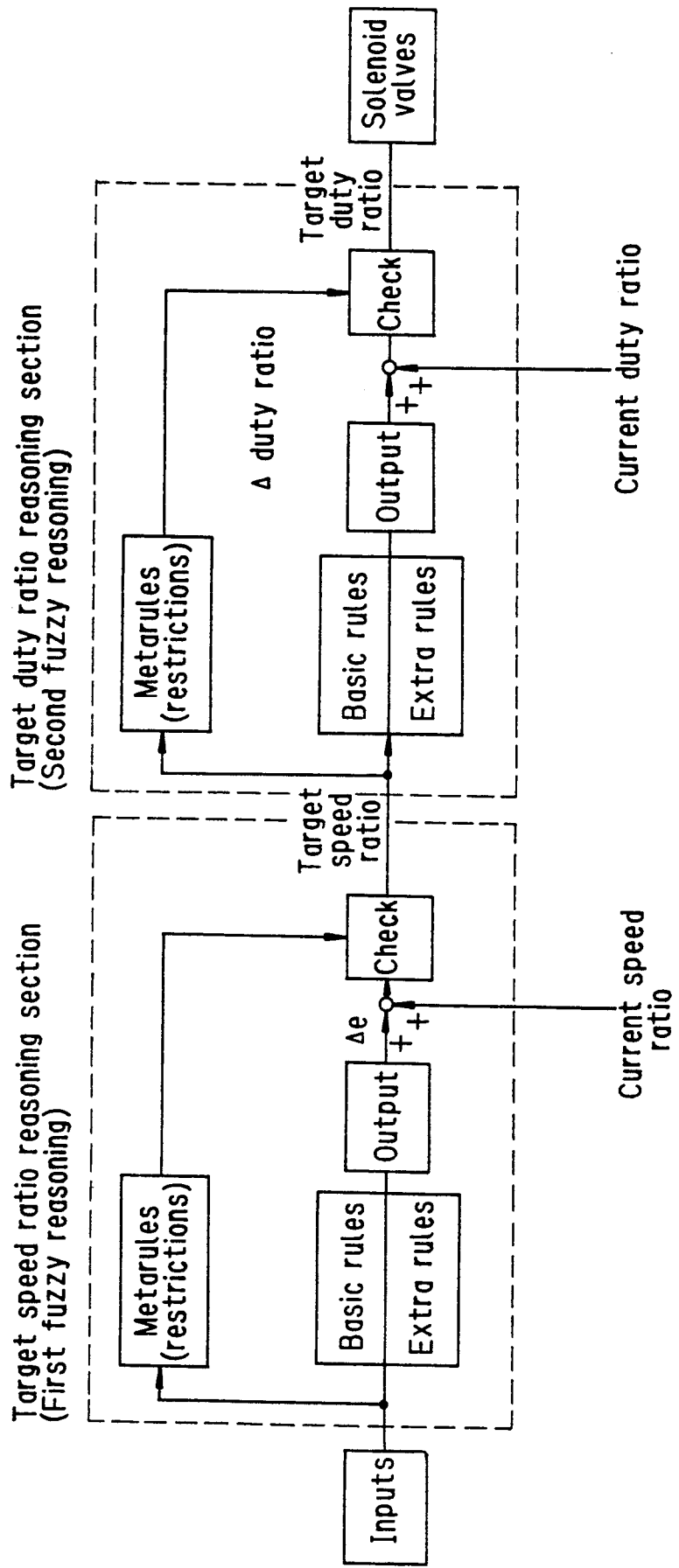
FIG. 5 is an explanatory block diagram showing the characteristic feature of the control system of the present invention.

Returning to FIG. 4, since the target speed ratio has now been decided through the foregoing operations, control passes to steps S16 and S18 in which a second fuzzy reasoning is conducted and the duty ratio control value for the solenoid valve 45 is decided, as shown in FIG. 5. In view of the fact that the second processing reasoning does not differ from the first fuzzy reasoning conducted in steps S12 and S14, therefore, no further explanation will be given. The fuzzy reasoning is conducted in two successive steps because, owing to the implementation of the control through hydraulic pressure, the actual speed ratio would not immediately follow the target speed ratio decided through the fuzzy reasoning should it be directly used to operate the solenoid valve. The second fuzzy reasoning is therefore conducted for ensuring that the actual speed ratio properly follows the target value. Fuzzy reasoning is used because it is well adapted to control for enhancing following characteristics.

Figure 27:
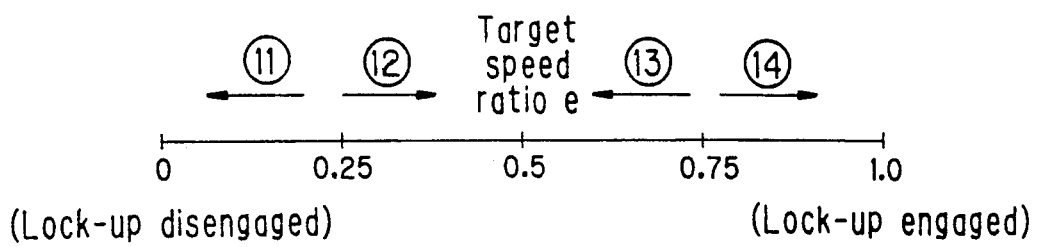
FIG. 27 is an explanatory view explaining the meaning of rules shown in FIG. 9.

Some additional explanation will now be given regarding the fuzzy production rules of FIGS. 9-11 that were used for deciding the duty ratio control value. The rules shown in FIGS. 9-11 are for conducting follow-up control based on the deviation between the target speed ratio value decided earlier and the current speed ratio value, with the aim of achieving an actual value equal to the target value. Rule 11 states that if the deviation E between the target speed ratio and the current speed ratio is large in the positive direction and the speed ratio deviation change delta E is large in the positive direction, then the amount of operation is to be made large in the negative direction. This will be better understood from the example shown in FIG. 27. If the target speed ratio value is 0.5 and the current speed ratio is 0.25, the deviation is 0.5−0.25=+0.25, and, as indicated by arrow 11, the change is in the negative direction, i.e. away from the target value. Thus, since the slip is greater than the target value, the duty ratio is decreased to adjust the clutch in the direction of engagement. The rules 12-14 deal with the situations indicated by the arrows 12-14 in the figure. Rule 15 comes into play when the current speed ratio is in the vicinity of the target value, i.e. when the speed ratio deviation is near zero, and stipulates that under such circumstances if the second difference also indicates no change, the target value is to be left unchanged. Rules 16 and 17 deal with the opposite situation, namely cases in which the deviation between the current and target values is very large, and, therefore, as indicated in the figure, stipulate that the amount of operation (delta duty ratio) is to be made very large. Rules 18 and 19 specify that the amount of operation is to be made very large in the negative (positive) direction when the ATF temperature is low and deviation is large in the positive (negative) direction. The reason for this is that the response of the hydraulic pressure is slow when the ATF temperature is low.

As will be understood from the foregoing, the present embodiment decides the target speed ratio by conducting fuzzy reasoning on the basis of production rules which additionally include the grade resistance as a parameter and then decides the duty ratio control value (operation amount) by conducting a second fuzzy reasoning using the deviation between the so-decided target speed ratio and the current speed ratio. Thus, differently from the prior art systems which decide the lock-up clutch control value solely on the basis of the throttle opening and the vehicle speed, the system of this embodiment recognizes and conducts fuzzy reasoning on the basis of driving conditions that include the grade resistance, and because of this, can achieve lock-up clutch engagement control that is matched to a broad range of driving states. As a result, the system is able to simultaneously optimize drivability, fuel economy, noise suppression and the like, as can be seen, for example, from its ability to provide control which engages the lock-up clutch during gentle hill-climbing so as to enhance fuel economy but which disengages the lock-up clutch during steep hill-climbing so as to obtain greater torque increase.

Figure 28:
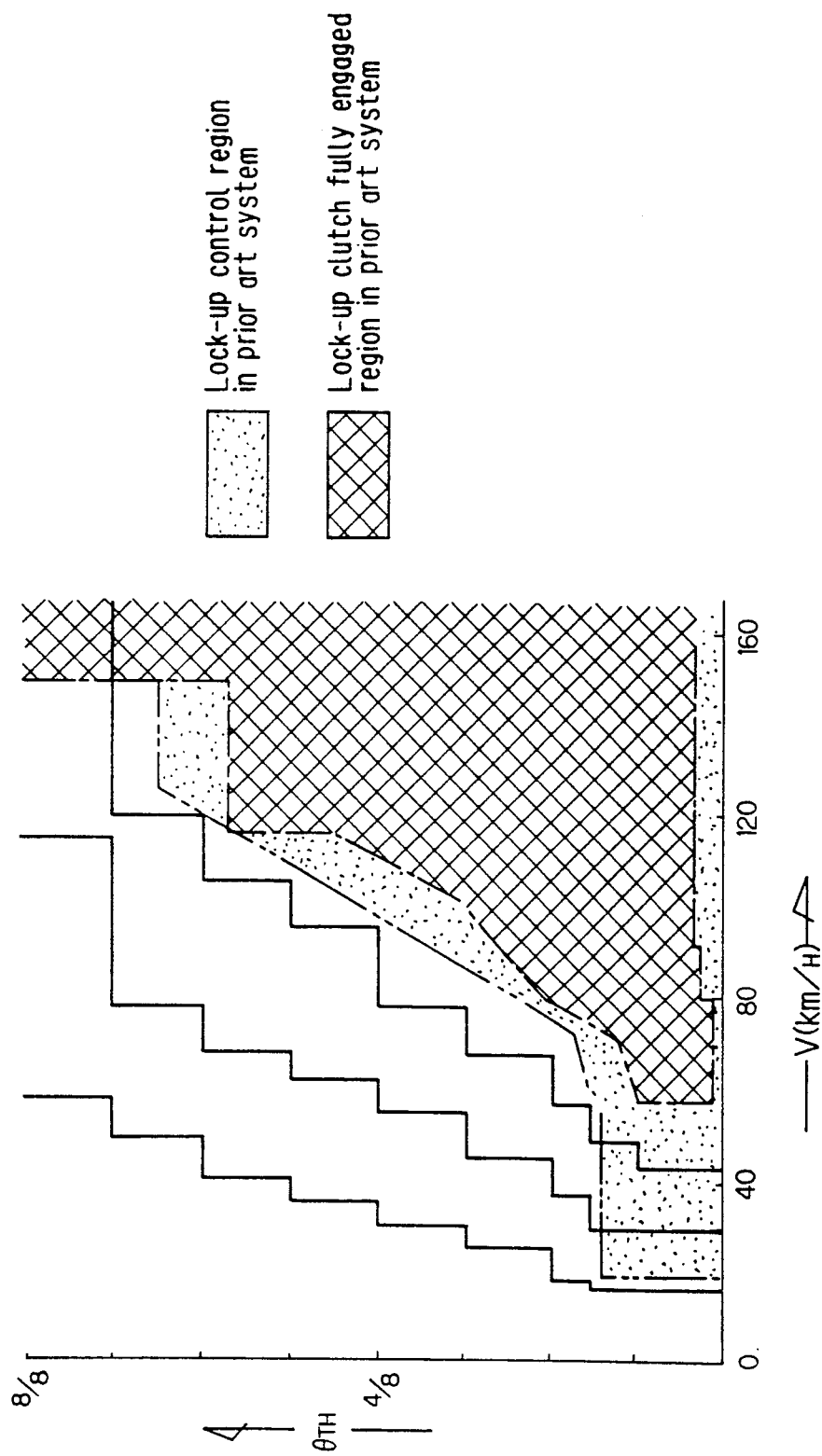
FIG. 28 is a graph showing a lock-up clutch control region in a prior system.
Figure 29:
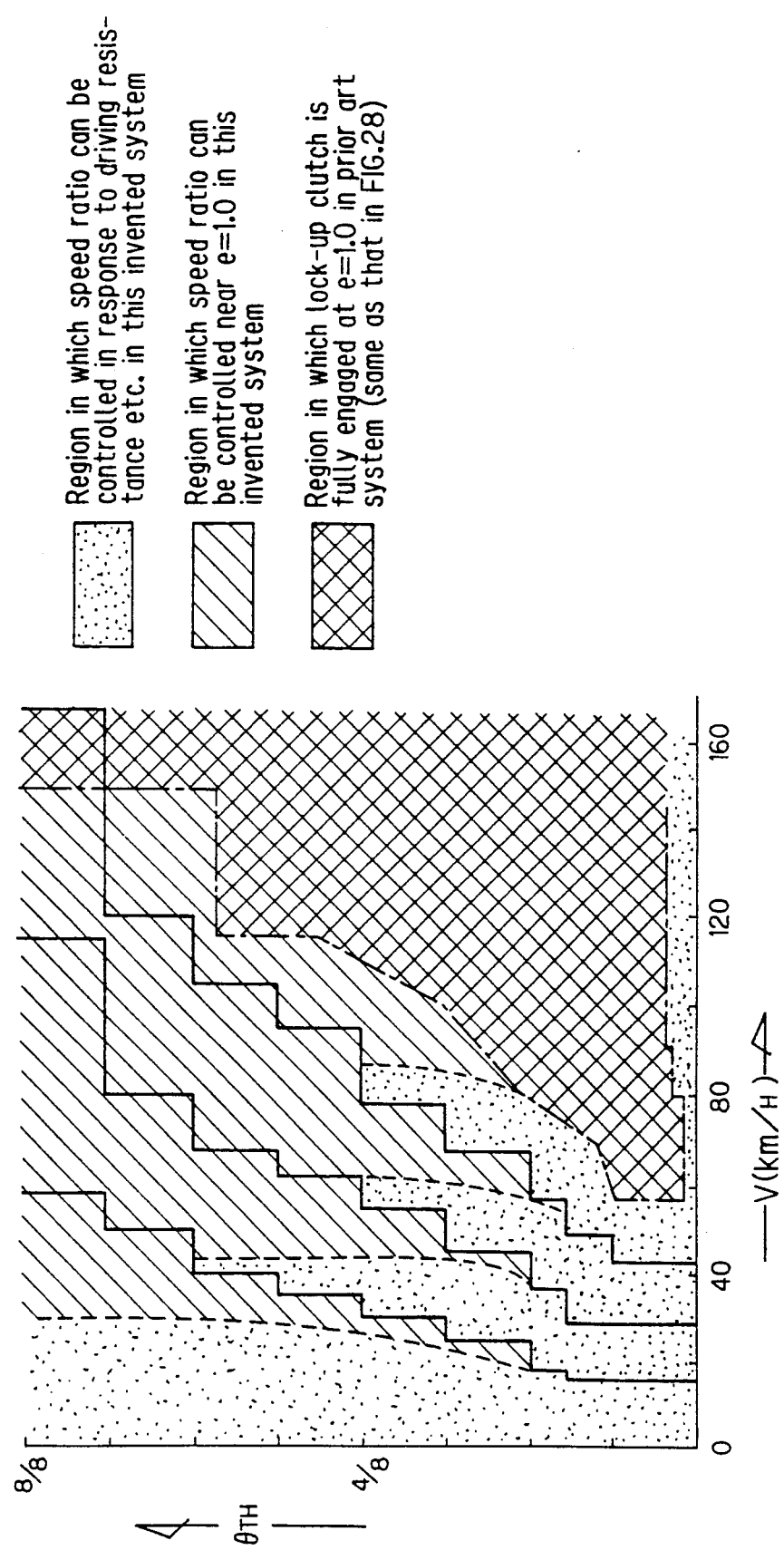
FIG. 29 is a graph showing a lock-up clutch control region in the system according to the present invention.

FIG. 28 shows the lock-up clutch control region according to the prior art control using map retrieval and FIG. 29 shows that according to the present invention control. It will be noted that the invention markedly expands the control region beyond that of the prior art. Moreover, differently from the system taught by Japanese Laid-open Patent Publication No. 3(1991)-103665 referred to earlier, which enables ON/OFF control between lock-up clutch engagement/disengagement only in the third and fourth gears of the D range, the system according to this invention, operating through its control of the lock-up speed ratio, controls the engaged, disengaged and semi-engaged states of the lock-up clutch in all gear positions. As a result, it is able to use semi-engaged states of the clutch for overcoming the problem of vehicle body vibration that variation in engine torque tends to cause in conventional systems when the lock-up clutch engages during low speed driving, and is also able to use its ability to establish semi-engaged clutch states for increasing fuel economy without sacrificing dynamic performance. In addition, while the prior art systems are only able to provide open loop control between two positions (ON and OFF), the system according to the invention uses closed loop control of the duty ratio for achieving the target speed ratio and is thus able to achieve a quantum improvement in control precision and response.

Further, since the reasoning is conducted using fuzzy production rules, compared with prior art systems that conduct reasoning using fuzzy relationships, the invention system facilitates the creation of a knowledge base and enables the control rules to be formulated in the manner of a dialogue, making it easier to incorporate the control know-how acquired by an experienced driver in operating a vehicle with a manual transmission. Another advantage is the ease with which the control rules shown in FIGS. 6–11 can be modified.

Moreover, the hierarchical organization of the fuzzy production rules according to the invention makes it possible to reduce the number of rules required to the very minimum, while the expedient employed during fuzzy reasoning of specifying the parameters and the like by numbers assigned thereto and of consolidating the individual processing operations by type in advance enables the processing to be simplified and the processing time to be shortened.

Further, since the grade resistance is obtained by subtracting the level-driving resistance from the total driving resistance, the cost of the sensor system is reduced and the grade resistance can be obtained with higher accuracy than in the prior art systems.

Control including the lock-up clutch control can be broadly classified into position type control and speed type control. If anything, the prior art systems fall into the category of position type control. In contrast, the embodiment of this invention described above conducts speed type control in which the value obtained through fuzzy reasoning is added to the current value obtained through calculating the amount of change, whereby the operations and intentions of a human driver can be reflected in the control to a higher degree than is possible in the prior art systems. This is because, taking clutch operation of a manual transmission as an example, the human driver does not reason in terms of absolute positional operations (position type control) in the manner of "slip the clutch for obtaining such-and-such slip rate at this time" but along the lines of "it's slipping this much already so slip it this much more." This is speed type control in the proper sense of the term. In position type control a separate rule has to be written to express the characteristics of every combination of possible current and post-control values. For example, for specifying the gear position of a transmission with four forward speeds in position type control, it becomes necessary to establish rules in the manner of "IF in first gear . . . , THEN stay in first gear," "IF in second gear . . . , THEN stay in second gear," "IF in fourth gear . . . THEN stay in fourth gear," etc. The number of rules required thus becomes enormous. In speed type control, on the other hand, the characteristics can be expressed independently of the current value, which reduces the number of rules required. In the embodiment, since the speed ratio is determined through the speed type control, the value can be determined faster than obtaining it through the feedback control. On the other hand, the duty ratio is then determined through the feedback control, the duty ratio can be determined accurately.

While the aforesaid embodiment uses an arrangement in which the fuzzy reasoning for deciding the target speed ratio and the fuzzy reasoning for deciding the target duty ratio are conducted separately in two stages, the invention is not limited to this and it is alternatively possible to decide the target duty ratio immediately on the basis of the rules set out in the figures. Also, while the embodiment decides the target duty ratio through further fuzzy reasoning conducted on the basis of the target speed ratio obtained, the invention is not limited to this arrangement and it is alternatively possible to decided the target duty value using PID control, modern theory control or the like.

Moreover, while FIG. 4 shows a case in which the first and second fuzzy reasoning are conducted by the same program, i.e. with the same control period, the invention is not limited to this arrangement and it is alternatively possible to conduct them using different control periods.

In addition, while the grade resistance was obtained by calculation in the foregoing embodiment, it is alternatively possible to obtain it from the output of a separately provided grade sensor.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling a lock-up clutch of a torque converter of an automatic transmission of a vehicle which mechanically couples a pump impeller connected to an engine output shaft with a turbine runner connected to a transmission input shaft, comprising:

first means for determining parameters indicative of operating conditions of said vehicle at least including an engine load, a driving resistance and a current speed ratio of said torque converter between a speed of said pump impeller and a speed of said turbine runner indicting a slipping condition of said lock-up clutch;

second means for carrying out a fuzzy reasoning to determine a target speed ratio of said torque converter indicating a slipping condition of said lock-up clutch based on fuzzy production rules with each said rule having an antecedent made up of a membership function defined with respect to at least one of said parameters and a consequent made up of a membership function defined with respect to said determined target speed ration; and third means for determining a control value of an actuator in response to said determined target speed ratio of said torque converter indicating a slipping condition of said lock-up clutch between the states in which said lock-up clutch is fully locked up and said lock-up clutch is fully not locked up including the state in which said lock-up clutch is partially locked up.

2. A system according to claim 1, wherein said third means determines said control value in a manner for causing said current speed ratio to be feedback controlled to said determined target speed ratio.

3. A system according to claim 2, wherein said third means calculates a deviation between said determined target speed ratio and said current speed ratio and carries out a second fuzzy reasoning to determine said control value based on second fuzzy production rules, each said second fuzzy production rule having an antecedent made up of a membership function defined at least with respect to said deviation and a consequent made up of a membership function defined at least with respect to said control value.

4. A system according to claim 3, wherein said fuzzy production rules are hierarchically defined based on an analysis of a human being's judgment.

5. A system according to claim 3, wherein said parameters and said membership functions defined thereon are numbered to precalculate the membership values of said determined parameters, and a satisfaction degree of rule is calculated from said precalculated values.

6. A system according to claim 3, wherein said membership function of said antecedent of said fuzzy production rules are defined with respect to at least one among a deviation between said target speed ratio and said current speed ratio, a change of said deviation and a transmission temperature.

7. A system according to claim 2, wherein said third means determines said control value by determining a PWM control value of a hydraulic pressure driving a piston of said lock-up clutch into a fully or partially engaged or disengaged position defined in terms of a pulse duty ratio.

8. A system according to claim 1, wherein said driving resistance is calculated using the law of motion.

9. A system according to claim 8, wherein said driving resistance is a grade resistance and said first means determines said grade resistance by subtracting a predetermined drive resistance on a level road from said driving resistance calculated using the law of motion.

10. A system according to claim 9, wherein said predetermined driving resistance on a level road is defined with respect to a vehicle speed.

11. A system according to claim 1, wherein said fuzzy production rules are hierarchically defined based on an analysis of a human being's judgment.

12. A system according to claim 1, wherein said parameters and said membership functions defined thereon are numbered to precalculate membership values of said determined parameters, and a satisfaction degree of rule is calculated from said precalculated membership values.

13. A system according to claim 1, wherein said membership of said antecedent of said fuzzy production rules are defined with respect to at least one among said engine load, said current speed ratio, a turbine runner speed, said grade resistance, a transmission temperature and a vehicle tire speed.

14. A system for controlling a lock-up clutch of a torque converter of an automatic transmission of a vehicle which mechanically couples a pump impeller connected to an engine output shaft with a turbine runner connected to a transmission input shaft, comprising:

first means for determining parameters indicative of operating conditions of said vehicle at least including an engine load, a driving resistance and a speed ratio of said torque converter;

second means for carrying out a fuzzy reasoning to determine a target speed ratio based on fuzzy production rules with each said rule having an antecedent made up of a membership function defined with respect to at least one of said parameters and a consequent made up of a membership function defined with respect to said determined target speed ration; wherein said fuzzy production rules include at least one rule which is given a priority over the others and;

third means for determining a control value of an actuator in response to said determined target speed ratio between the states in which said lock-up clutch is fully locked up and said lock-up clutch is fully not locked up including the state in which said lock-up clutch is partially locked up.

15. A system according to claim 14, wherein said second means carries out a first fuzzy reasoning to determine a satisfaction degree of rules and carries out a third fuzzy reasoning on said rule which is given a priority over the others to calculates a satisfaction degree of the rule, compares the two calculated values with each other and if said value calculated by the third fuzzy reasoning is greater than that calculated by said first fuzzy reasoning, a result of said first fuzzy reasoning is canceled.

16. A system for controlling a lock-up clutch of a torque converter of an automatic transmission of a vehicle which mechanically couples a pump impeller connected to an engine output shaft with a turbine runner connected to a transmission input shaft, comprising:

first means for determining parameters indicative of operating conditions of said vehicle at least including an engine load, a driving resistance and a current speed ratio of said torque converter between a speed of said pump impeller and a speed of said turbine runner indicating a slipping condition of said lock-up clutch;

second means for carrying out a fuzzy reasoning to determine a target speed ratio of said torque converter indicating a slipping of said lock-up clutch; and third means for determining a control value of an actuator in response to said determined target speed ratio between the states in which said lock-up clutch is fully locked up and said lock-up clutch is fully not locked up including the state in which said lock-up clutch is partially locked up.

* * * * *

UNITED STATES PATENT AND TRADEMARK OFFICE
CERTIFICATE OF CORRECTION

PATENT NO. : 5,267,158
DATED : November 30, 1993
INVENTOR(S) : Sakaguchi et al.

It is certified that error appears in the above-indentified patent and that said Letters Patent is hereby corrected as shown below:

Column 18, claim 13, line 37, before "of said" insert -- function --.

Column 18, claim 14, line 58, delete "ration" and substitute -- ratio --.

Signed and Sealed this

Eleventh Day of October, 1994

Attest:

BRUCE LEHMAN

Attesting Officer

Commissioner of Patents and Trademarks